United States Patent
Zhang et al.

(10) Patent No.: US 9,538,538 B2
(45) Date of Patent: Jan. 3, 2017

(54) SATELLITE BEAM POWER BACKOFF

(71) Applicant: QUALCOMM Incorporated, San Diego, CA (US)

(72) Inventors: Dan Zhang, San Diego, CA (US); Mehmet Izzet Gurelli, San Diego, CA (US); Sumeeth Nagaraja, San Diego, CA (US); Dan Vassilovski, Del Mar, CA (US); James Taylor Determan, Encinitas, CA (US); Gene Wesley Marsh, Encinitas, CA (US); Qiang Wu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/864,758

(22) Filed: Sep. 24, 2015

(65) Prior Publication Data

US 2016/0278063 A1    Sep. 22, 2016

Related U.S. Application Data

(60) Provisional application No. 62/136,075, filed on Mar. 20, 2015, provisional application No. 62/188,306, filed on Jul. 2, 2015.

(51) Int. Cl.
    H04B 7/185    (2006.01)
    H04W 72/04    (2009.01)

(52) U.S. Cl.
    CPC ....... H04W 72/046 (2013.01); H04W 72/0473 (2013.01)

(58) Field of Classification Search
    CPC .......................... H04W 72/046; H04W 72/0473
    (Continued)

(56) References Cited

U.S. PATENT DOCUMENTS

| 5,625,868 A | 4/1997 | Jan et al. |
| 6,011,951 A * | 1/2000 | King .................. H04B 7/195 455/13.2 |

(Continued)

FOREIGN PATENT DOCUMENTS

| EP | 0944183 A1 | 9/1999 |
| EP | 1223691 A2 | 7/2002 |

(Continued)

OTHER PUBLICATIONS

ITU-R S.1503-2, "Functional description to be used in developing software tools for determining conformity of non-geostationary-satellite orbit fixed-satellite system networks with limits contained in Article 22 of the Radio Regulations", S series, Fixed Satellite service, Fixed Satellite service, Dec. 2013, pp. 1-115.

(Continued)

*Primary Examiner* — Md Talukder
(74) *Attorney, Agent, or Firm* — Paradice and Li LLP

(57) ABSTRACT

A method and apparatus for a non-geosynchronous orbit (NGSO) satellite to comply with equivalent power flux density (EPFD) limits are disclosed. The example implementations may allow a constellation of NGSO satellites to comply with EPFD limits without disabling beams transmitted from the NGSO satellites. The power level of one or more beams to be transmitted from the NGSO satellites may be dynamically adjusted according to a beam power back-off schedule. In some aspects, the beam power back-off schedule may specify beam power back-off values as a function of latitude on Earth, and may allow for maximum allowable power levels for beams transmitted from the NGSO satellites without violating any of the EPFD percentile limits.

30 Claims, 17 Drawing Sheets

(58) Field of Classification Search
USPC ............ 455/12.1, 13.4, 13.2, 3.02, 427, 428
See application file for complete search history.

(56) References Cited

U.S. PATENT DOCUMENTS

| | | | |
|---|---|---|---|
| 6,055,431 | A | 4/2000 | Dybdal |
| 6,236,834 | B1 | 5/2001 | Poskett et al. |
| 6,587,687 | B1 | 7/2003 | Wiedeman |
| 6,678,520 | B1 | 1/2004 | Wang |
| 6,775,251 | B1 | 8/2004 | Wiedeman et al. |
| 6,850,732 | B2 | 2/2005 | Patterson et al. |
| 6,866,231 | B2 | 3/2005 | Higgins |
| 7,554,937 | B2* | 6/2009 | Lim ................... H04B 7/1858 370/316 |
| 7,627,284 | B2 | 12/2009 | Wang |
| 7,706,787 | B2 | 4/2010 | Malarky et al. |
| 7,840,180 | B2 | 11/2010 | Rosen |
| 7,995,989 | B2 | 8/2011 | Wiedeman et al. |
| 8,897,769 | B2 | 11/2014 | Miller et al. |
| 2001/0045494 | A1* | 11/2001 | Higgins ............... B64G 1/1007 244/158.4 |
| 2003/0034422 | A1* | 2/2003 | Higgins ............... B64G 1/1007 244/158.4 |
| 2003/0081573 | A1* | 5/2003 | Anderson .......... H04B 7/18543 370/333 |
| 2004/0092257 | A1* | 5/2004 | Chung ................ H04B 7/2041 455/429 |
| 2004/0110467 | A1* | 6/2004 | Wang ................. H04B 7/18513 455/12.1 |
| 2007/0117509 | A1* | 5/2007 | Wang .................... H04B 7/195 455/12.1 |
| 2008/0242339 | A1* | 10/2008 | Anderson .......... H04B 7/18543 455/522 |
| 2013/0069820 | A1* | 3/2013 | Wyler ................. H04B 7/2041 342/354 |
| 2014/0177521 | A1 | 6/2014 | Agarwal |
| 2015/0158602 | A1* | 6/2015 | Marshack ............ B64G 1/1085 244/158.4 |

FOREIGN PATENT DOCUMENTS

| | | |
|---|---|---|
| WO | WO-00/41340 A1 | 7/2000 |
| WO | WO-02053455 A1 | 7/2002 |

OTHER PUBLICATIONS

Marsh, G. et al., "Dynamic Frequency Allocation of Satellite Beams", Co-pending U.S. Appl. No. 14/864,722, filed Sep. 24, 2015.

Marsh, G. et al., "EPFD Coverage for NGSO Satellites", Co-pending U.S. Appl. No. 14/864,791, filed Sep. 24, 2015.

International Search Report and Written Opinion—PCT/US2016/021082—ISA/EPO—Jun. 6, 2016.

* cited by examiner

SATELLITE BEAM POWER BACKOFF

CROSS-REFERENCE TO RELATED APPLICATIONS

This application claims priority under 35 USC 119(e) and commonly owned U.S. Provisional Patent Application No. 62/136,075 entitled "IMPROVING EPFD COVERAGE FOR NGSO SATELLITES" filed on Mar. 20, 2015 and commonly owned U.S. Provisional Patent Application No. 62/188,306 entitled "BEAM POWER BACKOFF" filed on Jul. 2, 2015, the entireties of both are incorporated by reference herein.

INTRODUCTION

Various aspects described herein relate to satellite communications, and more particularly to complying with international regulations governing satellite communications.

Conventional satellite-based communication systems include gateways and one or more satellites to relay communication signals between the gateways and one or more user terminals. A gateway is an earth station having an antenna for transmitting signals to, and receiving signals from, communication satellites. A gateway provides communication links, using satellites, for connecting a user terminal to other user terminals or users of other communication systems, such as a public switched telephone network, the internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of one or more antennas. Each beam covers a particular geographic region within the footprint. Beams may be directed so that more than one beam from the same satellite covers the same specific geographic region.

Geosynchronous satellites have long been used for communications. A geosynchronous satellite is stationary relative to a given location on the Earth, and thus there is little timing shift and frequency shift in radio signal propagation between a communication transceiver on the Earth and the geosynchronous satellite. However, because geosynchronous satellites are limited to a geosynchronous orbit (GSO), the number of satellites that may be placed in the GSO is limited. As alternatives to geosynchronous satellites, communication systems which utilize a constellation of satellites in non-geosynchronous orbits (NGSO), such as low-earth orbits (LEO), have been devised to provide communication coverage to the entire Earth or at least large parts of the Earth.

GSO and NGSO satellites may operate on the same (or similar) frequency bands, and therefore interference mitigation techniques may be employed by NGSO satellites so that GSO satellite communications are not impaired by NGSO satellite transmissions. For example, the International Telecommunication Union (ITU) provides limits on the equivalent power flux-density (EPFD) that an NGSO satellite may produce at any point on the Earth's surface lying within the footprint of a GSO satellite.

Because calculating the EPFD at a given point on the earth's surface may require extensive knowledge of the antenna and/or transmissions characteristics of various ground stations, NGSO satellites typically use other techniques to meet the ITU's EPFD limits. One method of meeting the EPFD limits is for an NGSO satellite to disable its beam if, at any point in the beam's coverage area on earth, the angle between the NGSO satellite and the GSO satellite is less than a threshold angle (e.g., which may indicate that the GSO satellite's beam termination point on earth lies within the coverage area of the NGSO satellite's beam). Although disabling the beam of an NGSO satellite in this manner may allow the NGSO satellite to meet the EPFD limits, this may result in unnecessary coverage gaps for the NGSO satellite communication system (e.g., when only a portion of the NGSO satellite's beam interferes with the GSO satellite's transmissions).

SUMMARY

Aspects of the disclosure are directed to apparatus and methods for maximizing beam power levels of NGSO satellites without violating the ITU's EPFD limits on NGSO satellite communications. In one example, a method of operating an NGSO satellite to comply with equivalent power flux density (EPFD) limits is disclosed. The method may include, for each of a number of selected locations on Earth, determining a first cumulative distribution function (CDF) of EPFD levels associated with reception of a beam, to be transmitted from the NGSO satellite, at the selected location, identifying a number of EPFD percentile limits that are violated by the first CDF of EPFD levels, determining a second CDF of EPFD levels at the selected location based, at least in part, on the number of identified EPFD percentile limits, and determining a power back-off value for the selected location based, at least in part, on the second CDF of EPFD levels. The method may also include compiling the determined power back-off values for the number of selected locations into a power back-off schedule, and dynamically adjusting a power level of the beam to be transmitted from the NGSO satellite based on the power back-off schedule.

In another example, an apparatus for operating an NGSO satellite to comply with EPFD limits is disclosed. The apparatus may include, for each of a number of selected locations on Earth, means for determining a first cumulative distribution function (CDF) of EPFD levels associated with reception of a beam, to be transmitted from the NGSO satellite, at the selected location, means for identifying a number of EPFD percentile limits that are violated by the first CDF of EPFD levels, means for determining a second CDF of EPFD levels at the selected location based, at least in part, on the number of identified EPFD percentile limits, and means for determining a power back-off value for the selected location based, at least in part, on the second CDF of EPFD levels. The apparatus may also include means for compiling the determined power back-off values for the number of selected locations into a power back-off schedule, and means for dynamically adjusting a power level of the beam to be transmitted from the NGSO satellite based on the power back-off schedule.

In another example, an apparatus for operating an NGSO satellite to comply with EPFD limits is disclosed. The apparatus may include one or more processors and a memory configured to store instructions. Execution of the instructions by the one or more processors may cause the apparatus to, for each of a number of selected locations on Earth, determine a first cumulative distribution function (CDF) of EPFD levels associated with reception of a beam, to be transmitted from the NGSO satellite, at the selected location, identify a number of EPFD percentile limits that are violated by the first CDF of EPFD levels, determine a second CDF of EPFD levels at the selected location based, at least in part, on the number of identified EPFD percentile limits, and determine a power back-off value for the selected location based, at least in part, on the second CDF of EPFD levels. Execution of the instructions by the one or more processors may also cause the apparatus to compile the determined power back-off values for the number of selected locations into a power back-off schedule, and dynamically adjust a power level of the beam to be transmitted from the NGSO satellite based on the power back-off schedule.

In another example, a non-transitory computer-readable medium is disclosed. The non-transitory computer-readable medium may store instructions that, when executed by one or more processors of an apparatus, cause the apparatus to operate an NGSO satellite to comply with EPFD limits. More specifically, execution of the instructions may cause the apparatus to, for each of a number of selected locations on Earth, determine a first cumulative distribution function (CDF) of EPFD levels associated with reception of a beam, to be transmitted from the NGSO satellite, at the selected location, identify a number of EPFD percentile limits that are violated by the first CDF of EPFD levels, determine a second CDF of EPFD levels at the selected location based, at least in part, on the number of identified EPFD percentile limits, and determine a power back-off value for the selected location based, at least in part, on the second CDF of EPFD levels. Execution of the instructions may also cause the apparatus to compile the determined power back-off values for the number of selected locations into a power back-off schedule, and dynamically adjust a power level of the beam to be transmitted from the NGSO satellite based on the power back-off schedule.

BRIEF DESCRIPTION OF THE DRAWINGS

Aspects of this disclosure are illustrated by way of example and are not intended to be limited by the figures of the accompanying drawings.

Like reference numerals refer to corresponding parts throughout the drawing figures.

DETAILED DESCRIPTION

Figure 1:
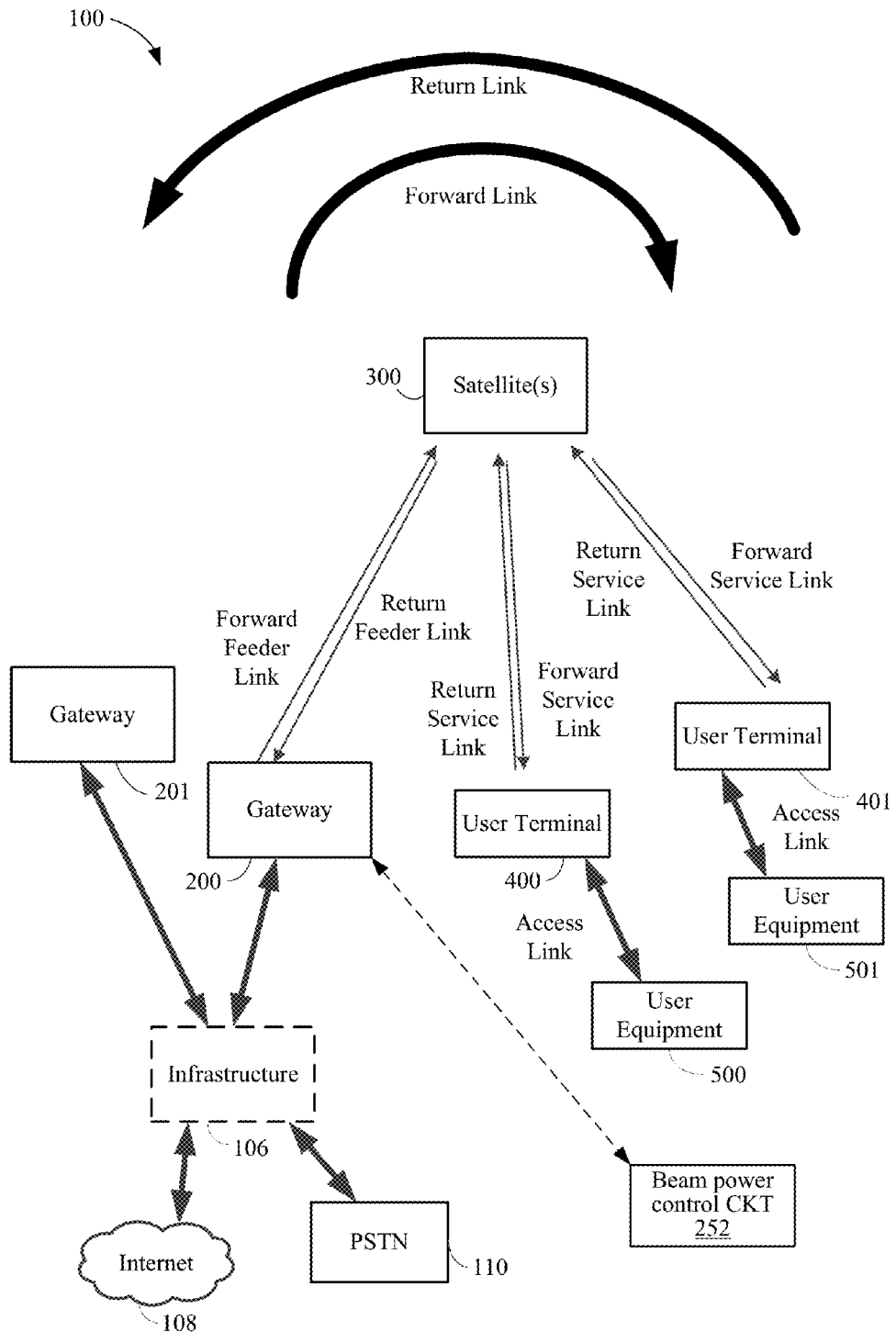
FIG. 1 shows a block diagram of an example communication system.

The example implementations described herein may allow a constellation of NGSO satellites to comply with various EPFD limits (e.g., the ITU's EPFD limits) without disabling beams transmitted from the NGSO satellites. As described in more detail below, the power level of one or more beams that may be transmitted from the NGSO satellites may be dynamically adjusted according to a beam power back-off schedule. In some aspects, the beam power back-off schedule may specify beam power back-off values as a function of time and/or satellite location (e.g., latitude on Earth), and may allow for maximum allowable power levels for beams transmitted from the NGSO satellites without violating various EPFD limits (e.g., the ITU's EPFD percentile limits).

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "I" between two adjacent words has the same meaning as "or" unless expressly stated otherwise. Moreover, phrases such as "connected to," "coupled to" or "in communication with" are not limited to direct connections unless expressly stated otherwise.

Further, many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the various aspects of the present disclosure. In other instances, well-known circuits and devices are shown in block diagram form to avoid obscuring the present disclosure. The various aspects of the present disclosure are not to be construed as limited to specific examples described herein but rather to include within their scopes all implementations defined by the appended claims.

FIG. 1 illustrates an example of a satellite communication system 100 which includes a plurality of satellites (although only one satellite 300 is shown for clarity of illustration) in non-geosynchronous orbits, for example, low-earth orbits (LEO), a gateway 200 in communication with the satellite 300, a plurality of user terminals (UTs) 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and return access link), and similarly, the UT 401 and the UE 501 communicate with each other via another bidirectional access link. In another implementation, one or more additional UE (not shown) may be configured to receive only and therefore communicate with a UT only using a forward access link. In another implementation, one or more additional UE (not shown) may also communicate with UT 400 or UT 401. Alternatively, a UT and a corresponding UE may be integral parts of a single physical device, such as a mobile telephone with an integral satellite transceiver and an antenna for communicating directly with a satellite, for example.

The gateway 200 may have access to the Internet 108 or one or more other types of public, semiprivate or private networks. In the example illustrated in FIG. 1, the gateway 200 is in communication with infrastructure 106, which is capable of accessing the Internet 108 or one or more other types of public, semiprivate or private networks. The gateway 200 may also be coupled to various types of communication backhaul, including, for example, landline networks such as optical fiber networks or public switched telephone networks (PSTN) 110. Further, in alternative implementations the gateway 200 may interface to the Internet 108, PSTN 110, or one or more other types of public, semiprivate or private networks without using infrastructure 106. Still further, gateway 200 may communicate with other gateways, such as gateway 201 through the infrastructure 106 or alternatively may be configured to communicate to gateway 201 without using infrastructure 106. Infrastructure 106 may include, in whole or part, a network control center (NCC), a satellite control center (SCC), a wired and/or wireless core network and/or any other components or systems used to facilitate operation of and/or communication with the satellite communication system 100.

Communications between the satellite 300 and the gateway 200 in both directions are called feeder links, whereas communications between the satellite and each of the UTs 400 and 401 in both directions are called service links. A signal path from the satellite 300 to a ground station, which may be the gateway 200 or one of the UTs 400 and 401, may be generically called a downlink. A signal path from a ground station to the satellite 300 may be generically called an uplink. Additionally, as illustrated, signals can have a general directionality such as a forward link and a return link or reverse link. Accordingly, a communication link in a direction originating from the gateway 200 and terminating at the UT 400 through the satellite 300 is called a forward link, whereas a communication link in a direction originating from the UT 400 and terminating at the gateway 200 through the satellite 300 is called a return link or reverse link. As such, the signal path from the gateway 200 to the satellite 300 is labeled "Forward Feeder Link" whereas the signal path from the satellite 300 to the gateway 200 is labeled "Return Feeder Link" in FIG. 1. In a similar manner, the signal path from each UT 400 or 401 to the satellite 300 is labeled "Return Service Link" whereas the signal path from the satellite 300 to each UT 400 or 401 is labeled "Forward Service Link" in FIG. 1.

In some implementations, the gateway 200 may transmit, to one or more corresponding satellites 300, a number of control signals and/or instructions that may cause each of the corresponding satellites 300 to selectively adjust the transmit power level of one or more of its satellite beams, for example, to comply with the ITU's ENT) limits for NGSO satellites. In some aspects, these control signals and/or instructions may be generated by a beam power control circuit 252 provided within, connected to, or otherwise associated with gateway 200. The beam power control circuit 252 may be implemented in any suitable manner and/or may include any suitable devices or components including, for example, CPUs, ASICs, DSPs, FPGAs, and the like. For at least some example implementations, the beam power control circuit 252 may be implemented (or the functions of beam power control circuit 252 may be performed) by execution of one or more programs containing instructions by any suitable one or more processors. The instructions may be stored in a non-transitory computer-readable medium.

Figure 2:
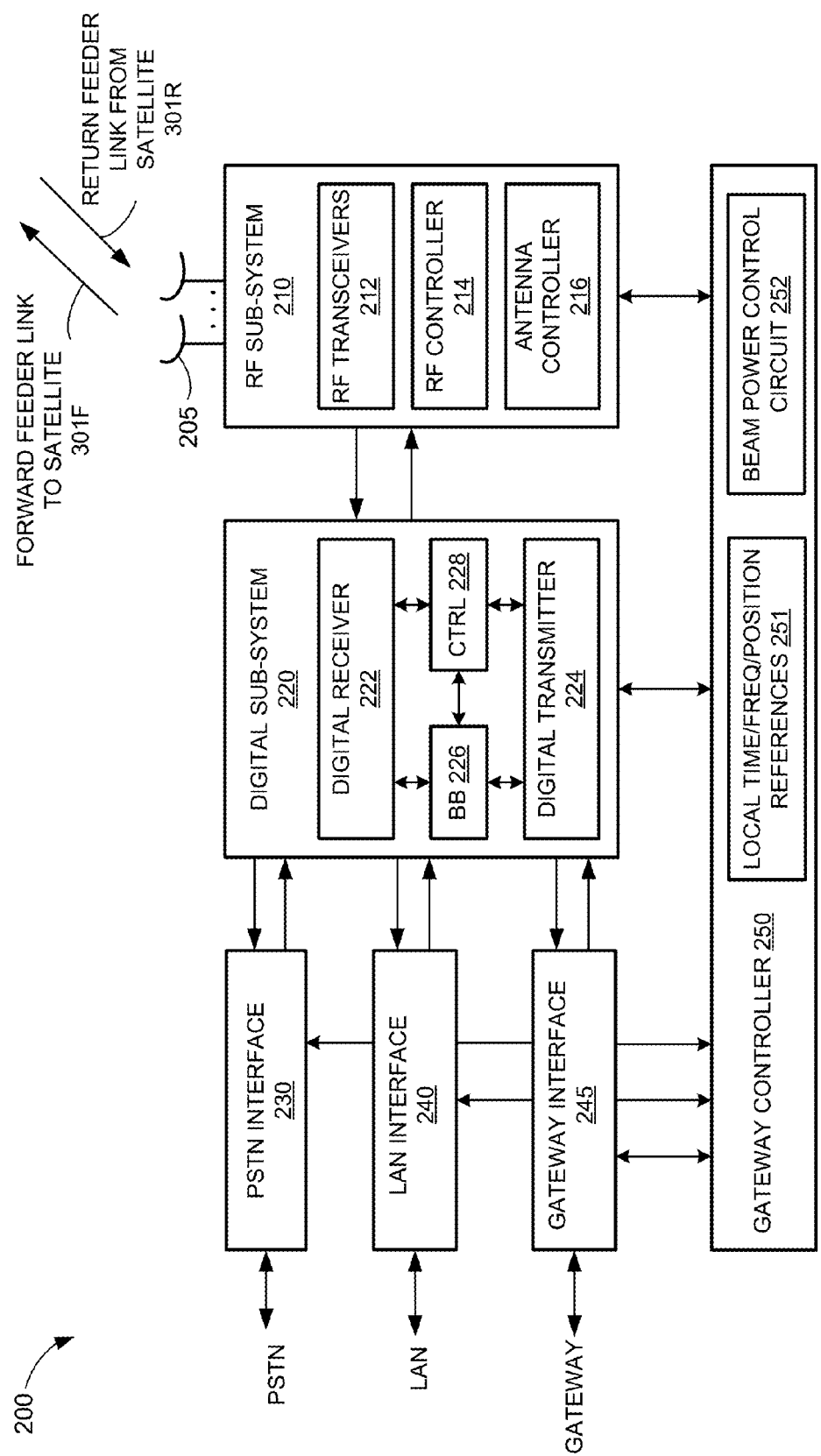
FIG. 2 shows a block diagram of one example of the gateway of FIG. 1.

FIG. 2 is an example block diagram of gateway 200, which also can apply to gateway 201 of FIG. 1. Gateway 200 is shown to include a number of antennas 205, an RF subsystem 210, a digital subsystem 220, a Public Switched Telephone Network (PSTN) interface 230, a Local Area Network (LAN) interface 240, a gateway interface 245, and a gateway controller 250. RF subsystem 210 is coupled to antennas 205 and to digital subsystem 220. Digital subsystem 220 is coupled to PSTN interface 230, to LAN interface 240, and to gateway interface 245. Gateway controller 250 is coupled to RF subsystem 210, digital subsystem 220, PSTN interface 230, LAN interface 240, and gateway interface 245.

RF subsystem 210, which may include a number of RF transceivers 212, an RF controller 214, and an antenna controller 216, may transmit communication signals to satellite 300 via a forward feeder link 301F, and may receive communication signals from satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by digital subsystem 220). Each transmit chain may include an up-converter (e.g., a mixer) and a power amplifier (PA) to up-convert and amplify, respectively, communication signals to be transmitted to satellite 300 in a well-known manner. In addition, each transmit chain may include a digital-to-analog converter (DAC) to convert the digital signals received from digital subsystem 220 to analog signals to be transmitted to satellite 300.

The RF controller 214 may be used to control various aspects of the number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. Digital subsystem 220 may process communication signals received from RF subsystem 210 and forward the processed communication signals to PSTN interface 230 and/or LAN interface 240, and may process communication signals received from PSTN interface 230 and/or LAN interface 240 and forward the processed communication signals to RF subsystem 210.

Each digital receiver module 222 may correspond to signal processing elements used to manage communications between gateway 200 and UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to UT 400 via satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to digital receiver modules 222, digital transmitter modules 224, and baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

Baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects gateway 200 to a ground-based network (e.g., the Internet).

The LAN interface 240 may provide communication signals to, and receive communication signals from, an external LAN. For example, LAN interface 240 may be coupled to the internet 108 either directly or through additional infrastructure 106, as illustrated in FIG. 1. The LAN interface 240 is well known in the art, and therefore is not described in detail herein.

The gateway interface 245 may provide communication signals to, and receive communication signals from, one or more other gateways associated with the satellite communication system 100 of FIG. 1 (and/or to/from gateways associated with other satellite communication systems, not shown for simplicity). For some implementations, gateway interface 245 may communicate with other gateways via one or more dedicated communication lines or channels (not shown for simplicity). For other implementations, gateway interface 245 may communicate with other gateways using PSTN 110 and/or other networks such as the Internet 108 (see also FIG. 1). For at least one implementation, gateway interface 245 may communicate with other gateways via infrastructure 106.

Overall gateway control may be provided by gateway controller 250. The gateway controller 250 may plan and control utilization of satellite 300's resources by gateway 200. For example, the gateway controller 250 may analyze trends, generate traffic plans, allocate satellite resources, monitor (or track) satellite positions, and monitor the performance of gateway 200 and/or satellite 300. The gateway controller 250 may also be coupled to a ground-based satellite controller (not shown for simplicity) that maintains and monitors orbits of satellite 300, relays satellite usage information to gateway 200, tracks the positions of satellite 300, and/or adjusts various channel settings of satellite 300.

For the example implementation illustrated in FIG. 2, the gateway controller 250 includes a local time, frequency, and position references 251, which may provide local time and frequency information to the RF subsystem 210, the digital subsystem 220, and/or the interfaces 230, 240, and 245. The time and frequency information may be used to synchronize the various components of gateway 200 with each other and/or with satellite(s) 300. The local time, frequency, and position references 251 may also provide position information (e.g., ephemeris data) of satellite(s) 300 to the various components of gateway 200. Further, although depicted in FIG. 2 as included within gateway controller 250, for other implementations, the local time, frequency, and position references 251 may be a separate subsystem that is coupled to gateway controller 250 (and/or to one or more of digital subsystem 220 and RF subsystem 210).

In the example implementation depicted in FIG. 2, the gateway controller 250 may include a beam power control circuit 252 to generate a number of control signals and/or instructions that, when transmitted to one or more corresponding satellites 300, may cause each of the corresponding satellites 300 to selectively adjust the transmit power of one or more of its beams to comply with the ITU's EPFD limits for NGSO satellites. As described in more detail below, each of the corresponding satellites 300 may selectively adjust the transmit power of one or more of its beams, based on the received control signals and/or instructions, in a manner that minimizes gaps in coverage provided by the corresponding satellites 300.

Although not shown in FIG. 2 for simplicity, the gateway controller 250 may also be coupled to a network control center (NCC) and/or a satellite control center (SCC). For example, the gateway controller 250 may allow the SCC to communicate directly with satellite(s) 300, for example, to retrieve ephemeris data from satellite(s) 300. The gateway controller 250 may also receive processed information (e.g., from the SCC and/or the NCC) that allows gateway controller 250 to properly aim its antennas 205 (e.g., at the appropriate satellite(s) 300), to schedule beam transmissions, to coordinate handovers, and to perform various other well-known functions. For at least some implementations, the NCC and/or the SCC may include a number of beam power control circuits 252 to generate the control signals and/or instructions for a number of satellites 300 (or for all satellites 300) in an associated NGSO satellite constellation. The NCC and/or the SCC may transmit the control signals and/or instructions to the satellites 300 via one or more gateways such as gateway 200. In some aspects, the beam power control circuit 252 may reside within the NCC and/or the SCC, and gateway 200 may not include the beam power control circuit 252.

Figure 3:
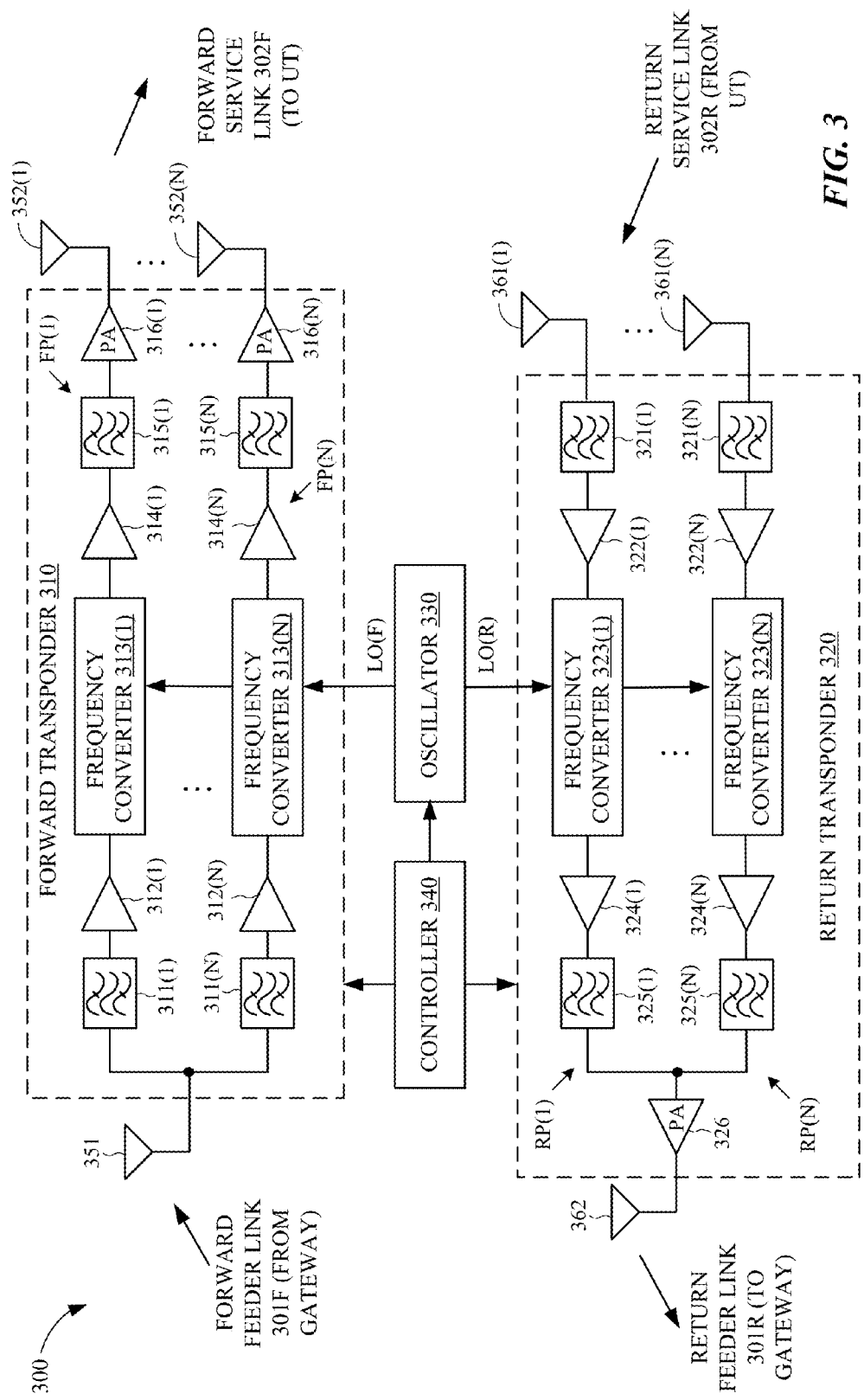
FIG. 3 shows a block diagram of one example of the satellite of FIG. 1.

FIG. 3 is an example block diagram of satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the gateway 200 and UT 400. It will be appreciated that disclosure is not limited to any specific satellite configuration and any satellite or combinations of satellites that can provide the functional connection between the gateway 200 and UT 400 can be considered within the scope of the disclosure. In one example, satellite 300 is shown to include a forward transponder 310, a return transponder 320, an oscillator 330, a controller 340, forward link antennas 351-352, and return link antennas 361-362. The forward transponder 310, which may process communication signals within a corresponding channel or frequency band, may include a respective one of first bandpass filters 311(1)-311(N), a respective one of first LNAs 312(1)-312(N), a respective one of frequency converters 313(1)-313(N), a respective one of second LNAs 314(1)-314(N), a respective one of second bandpass filters 315(1)-315(N), and a respective one of PAs 316(1)-316(N). Each of the PAs 316(1)-316(N) is coupled to a respective one of antennas 352(1)-352(N), as shown in FIG. 3.

Within each of the respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from satellite 300 to UT 400). The second LNA 314 amplifies the frequency-converted communication signals, and the second bandpass filter 315 filters signal components having frequencies outside of the associated channel width. The PA 316 amplifies the filtered signals to a power level suitable for transmission to UTs 400 via respective antenna 352. The return transponder 320, which includes a number N of return paths RP(1)-RP(N), receives communication signals from UT 400 along return service link 302R via antennas 361(1)-361(N), and transmits communication signals to gateway 200 along return feeder link 301R via one or more antennas 362. Each of the return paths RP(1)-RP(N), which may process communication signals within a corresponding channel or frequency band, may be coupled to a respective one of antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from satellite 300 to gateway 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the gateway 200.

Oscillator 330, which may be any suitable circuit or device that generates an oscillating signal, provides a forward local oscillator signal LO(F) to the frequency converters 313(1)-313(N) of forward transponder 310, and provides a return local oscillator signal LO(R) to frequency converters 323(1)-323(N) of return transponder 320. For example, the LO(F) signal may be used by frequency converters 313(1)-313(N) to convert communication signals from a frequency band associated with the transmission of signals from gateway 200 to satellite 300 to a frequency band associated with the transmission of signals from satellite 300 to UT 400. The LO(R) signal may be used by frequency converters 323(1)-323(N) to convert communication signals from a frequency band associated with the transmission of signals from UT 400 to satellite 300 to a frequency band associated with the transmission of signals from satellite 300 to gateway 200.

Controller 340, which is coupled to forward transponder 310, return transponder 320, and oscillator 330, may control various operations of satellite 300 including (but not limited to) channel allocations. In one aspect, the controller 340 may include a memory coupled to a processor (not shown for simplicity). The memory may include a non-transitory computer-readable medium (e.g., one or more nonvolatile memory elements, such as EPROM, EEPROM, Flash memory, a hard drive, etc.) storing instructions that, when executed by the processor, cause the satellite 300 to perform operations including (but not limited to) those described herein with respect to FIGS. 10 and 11.

Figure 4:
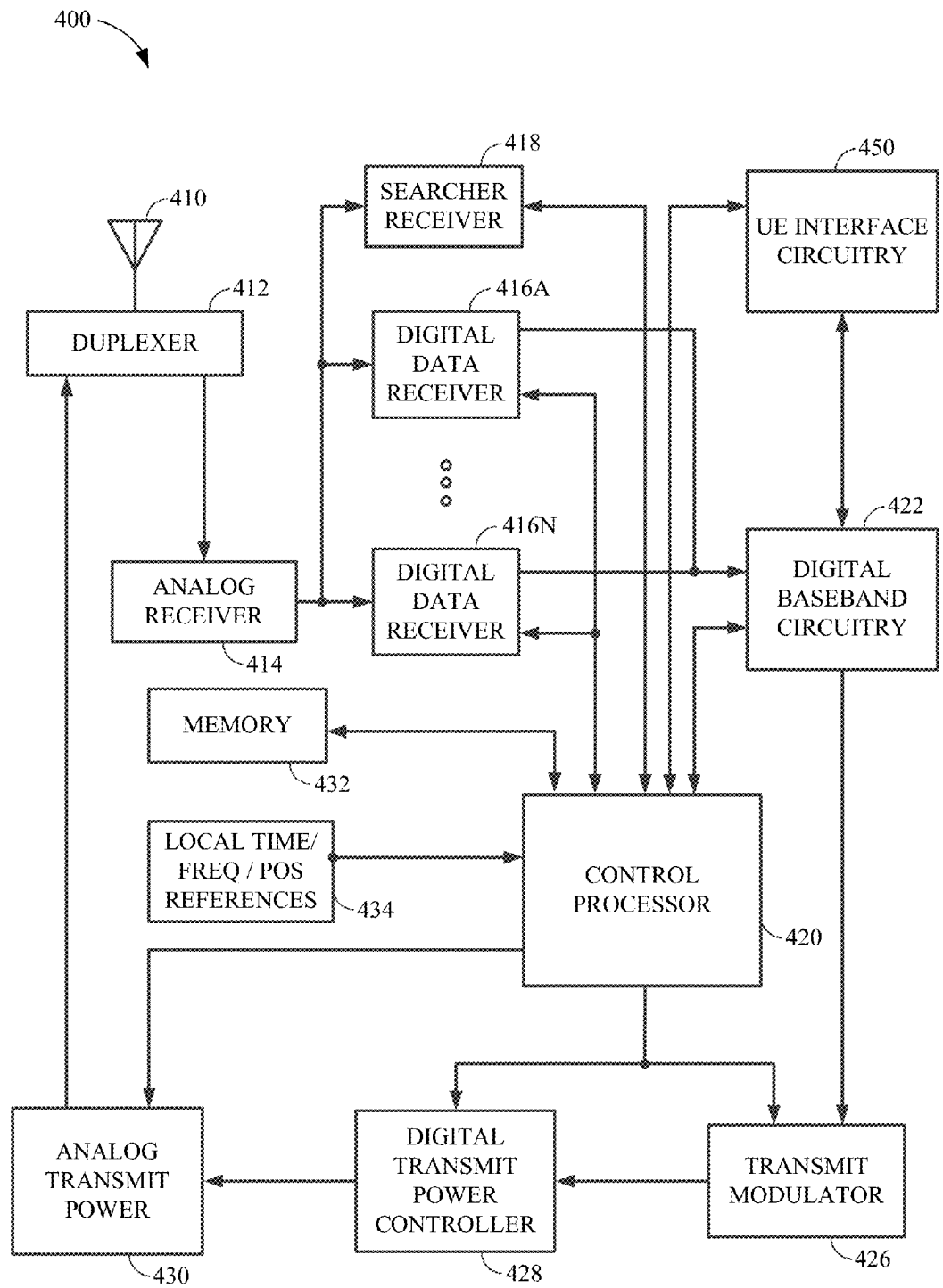
FIG. 4 shows a block diagram of one example of the user terminal (UT) of FIG. 1.

An example of a transceiver for use in the UT 400 or 401 is illustrated in FIG. 4. In FIG. 4, at least one antenna 410 is provided for receiving forward link communication signals (e.g., from satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers to 416N can be used to obtain desired levels of signal diversity, depending on the acceptable level of transceiver complexity, as would be apparent to one skilled in the relevant art.

At least one user terminal control processor 420 is coupled to digital data receivers 416A-416N and searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of digital data receivers 416A-416N are coupled to digital baseband circuitry 422 within the user terminal. The digital baseband circuitry 422 comprises processing and presentation elements used to transfer information to and from UE 500 as shown in FIG. 1, for example. Referring to FIG. 4, if diversity signal processing is employed, the digital baseband circuitry 422 may comprise a diversity combiner and decoder. Some of these elements may also operate under the control of, or in communication with, a control processor 420.

When voice or other data is prepared as an output message or communications signal originating with the user terminal, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., satellite 300).

In FIG. 4, the UT transceiver also includes a memory 432 associated with the control processor 420. The memory 432 may include instructions for execution by the control processor 420 as well as data for processing by the control processor 420.

In the example illustrated in FIG. 4, the UT 400 also includes an optional local time, frequency and/or position references 434 (e.g., a GPS receiver), which may provide local time, frequency and/or position information to the control processor 420 for various applications, including, for example, time and frequency synchronization for the UT 400.

Digital data receivers 416A-N and searcher receiver 418 are configured with signal correlation elements to demodulate and track specific signals. Searcher receiver 418 is used to search for pilot signals, or other relatively fixed pattern strong signals, while digital data receivers 416A-N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element 432 as desired.

The control processor 420 may also be coupled to UE interface circuitry 450 to allow communications between UT 400 and one or more UEs. UE interface circuitry 450 may be configured as desired for communication with various UE configurations and accordingly may include various transceivers and related components depending on the various communication technologies employed to communicate with the various UEs supported. For example, UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with UT 400.

Figure 5:
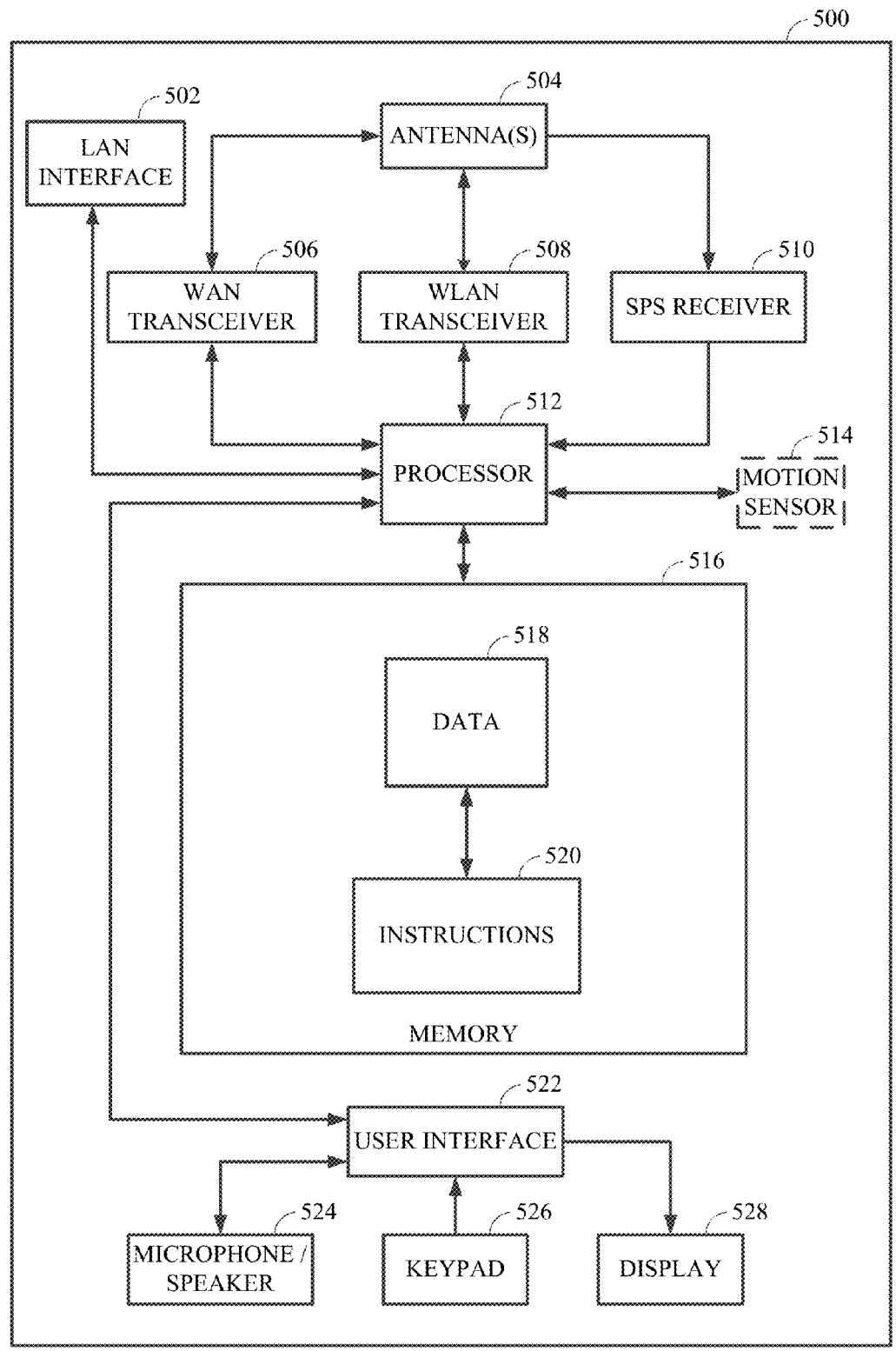
FIG. 5 shows a block diagram of one example of the user equipment (UE) of FIG. 1.

FIG. 5 is a block diagram illustrating an example of UE 500, which also can apply to UE 501 of FIG. 1. The UE 500 as shown in FIG. 5 may be a mobile device, a handheld computer, a tablet, a wearable device, a smart watch, or any type of device capable of interacting with a user, for example. Additionally, the UE may be a network side device that provides connectivity to various ultimate end user devices and/or to various public or private networks. In the example shown in FIG. 5, the UE 500 may comprise a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a Wi-Fi transceiver, with or without the LAN interface 502, WAN transceiver 506, and/or SPS receiver 510, for example. Further, UE 500 may include additional transceivers such as Bluetooth, ZigBee and other known technologies, with or without the LAN interface 502, WAN transceiver 506, WLAN transceiver 508 and/or SPS receiver 510. Accordingly, the elements illustrated for UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

As mentioned above, GSO satellites are deployed in geostationary orbits at approximately 35,000 km above the earth's surface, and revolve around the Earth in an equatorial orbit at the earth's own angular velocity. In contrast, NGSO satellites are deployed in non-geostationary orbits and revolve around the earth above various paths of the earth's surface at relatively low altitudes (e.g., as compared with GSO satellites).

Figure 6:
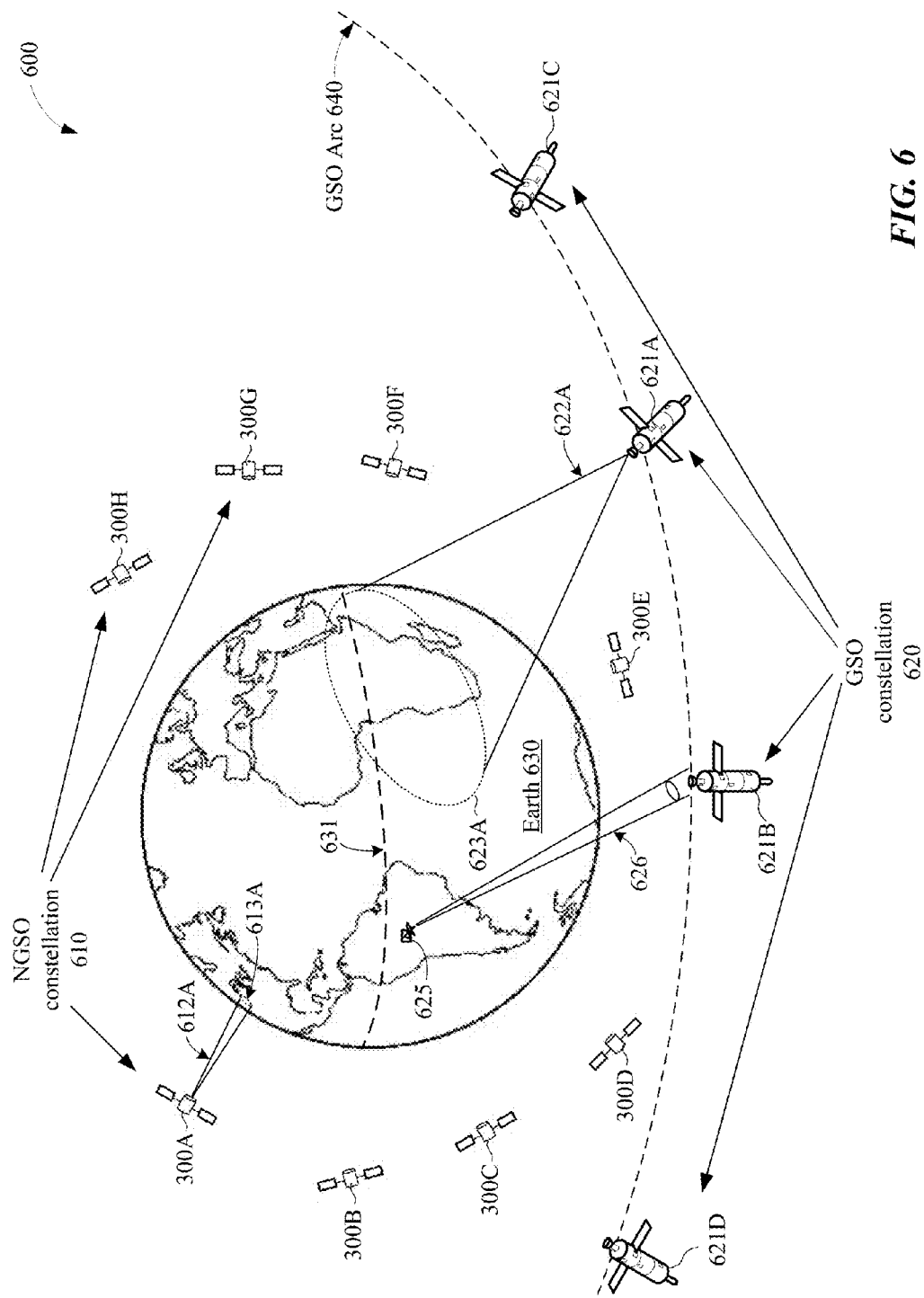
FIG. 6 shows a diagram depicting an NGSO satellite constellation and a GSO satellite constellation orbiting the Earth.

For example, FIG. 6 shows a diagram 600 depicting a first constellation 610 of NGSO satellites 300A-300H and a second constellation 620 of GSO satellites 621A-621D in orbit around Earth 630. Although depicted in FIG. 6 as including only eight NGSO satellites 300A-300H, the first constellation 610 may include any suitable number of NGSO satellites, for example, to provide world-wide satellite coverage. For some implementations, the first constellation 610 may include between 600 and 900 NGSO satellites. Similarly, although depicted in FIG. 6 as including only four GSO satellites 621A-621D, the second constellation 620 may include any suitable number of GSO satellites, for example, to provide world-wide satellite coverage. In addition, although not shown in FIG. 6 for simplicity, one or more other constellations of GSO satellites and/or one or more other constellations of NGSO satellites may be in orbit above Earth 630.

The first constellation 610, which may hereinafter be referred to as the NGSO satellite constellation 610, may provide a first satellite service to most, if not all, areas on Earth 630. The second constellation 620, which may hereinafter be referred to as the GSO satellite constellation 620, may provide a second satellite service to large portions of Earth 630. The first satellite service may be different than the second satellite service. For some aspects, the first satellite service provided by the NGSO satellite constellation 610 may correspond to a global broadband Internet service, and the second satellite service provided by the GSO satellite constellation 620 may correspond to a satellite-based broadcast (e.g., television) service. Further, for at least some implementations, each of NGSO satellites 300A-300H may be one example of satellite 300 of FIGS. 1 and 3.

The NGSO satellites 300A-300H may orbit the Earth 630 in any suitable number of non-geosynchronous orbital planes (not shown for simplicity), and each of the orbital planes may include a plurality of NGSO satellites (e.g., such as one or more of the NGSO satellites 300A-300H). The non-geosynchronous orbital planes may include, for example, polar orbital patterns and/or Walker orbital patterns. Thus, to a stationary observer on Earth 630, the NGSO satellites 300A-300H appear to move quickly across the sky in a plurality of different paths across the Earth's surface, with each of the NGSO satellites 300A-300H providing coverage for a corresponding path across the earth's surface.

In contrast, the GSO satellites 621A-621D may be in a geosynchronous orbit around Earth 630 and thus, to a stationary observer on Earth 630, may appear motionless in a fixed position in the sky located above the Earth's equator 631. Each of the GSO satellites 621A-621D maintains a relatively fixed line-of-sight with a corresponding GSO ground station on Earth 630. For example, GSO satellite 621B is depicted in FIG. 6 as maintaining a relatively fixed line-of-sight with a GSO ground station 625. It is noted that for a given point on the surface of Earth 630, there may be an arc of positions in the sky along which the GSO satellites 621A-621D may be located. This arc of GSO satellite positions may be referred to herein as the GSO arc 640. The receiving area for a GSO ground station (e.g., such as GSO ground station 625) may be defined by an antenna pattern of typically fixed orientation and fixed beam width (such as a beam width defined by an ITU specification). For example, the GSO ground station 625 is depicted as directing a beam 626 towards GSO satellite 621B.

In some aspects, each of the NGSO satellites 300A-300H may include a number of directional antennas to provide high-speed forward links (e.g., downlinks) with user terminals such as UT 400 of FIG. 1 and/or with gateways such as gateway 200 of FIG. 1. A high-gain directional antenna achieves higher data rates and is less susceptible to interference than an omni-directional antenna by focusing radiation into a relatively narrow beam width (as compared to the relatively wide beam width associated with an omni-directional antenna). For example, as depicted in FIG. 6, the coverage area 613A provided by a beam 612A transmitted from NGSO satellite 300A may be relatively small compared to the coverage area 623A provided by a beam 622A transmitted from GSO satellite 621A. Accordingly, although not shown in FIG. 6 for simplicity, the footprint of each of NGSO satellites 300A-300H may be significantly smaller than the footprint of each of GSO satellites 621A-621D.

Because the NGSO satellites 300A-300H may communicate with ground-based gateways (not shown in FIG. 6 for simplicity) using at least part of the same frequency spectrum used by GSO satellites 621A-621D, the NGSO satellites 300A-300H are not to exceed the EPFD limits established by the ITU. A given NGSO satellite most likely risks exceeding the EPFD limits and potentially interfering with GSO satellite communications if transmissions from both the given NGSO satellite and the GSO satellite are received at a point on the Earth's surface within the receiving area of a GSO ground station, for example, as defined by the GSO ground station's beam pattern (e.g., antenna pattern). For the example of FIG. 6, the beam pattern 626 of GSO ground station 625 may be defined by a line from the GSO ground station 625 to the GSO satellite 621B and an associated angular beam width. NGSO satellites 300A-300H may determine whether their transmissions are likely to exceed the EPFD limits and/or interfere with GSO satellite communications by comparing angles between the GSO arc, the GSO ground station, and the NGSO satellite, and then determining if the angles fall within the GSO ground station's beam pattern. Because of the relatively large footprints of the GSO satellites 621A-621D and the relatively large number of satellites in the NGSO satellite constellation 610, complying with the EPFD limits established by the ITU is, although challenging, important to the operation of the NGSO satellite constellation 610.

Figure 7A:
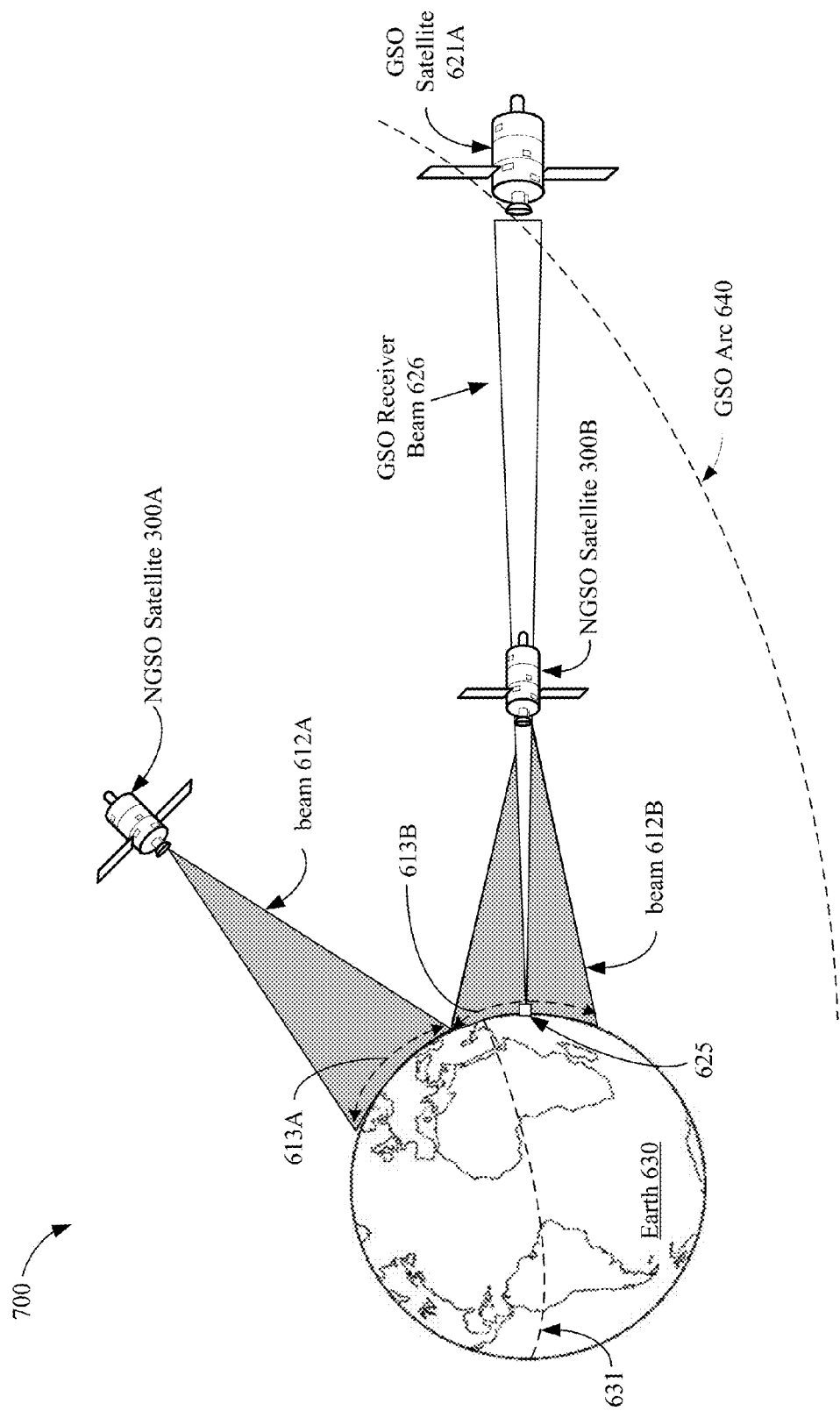
FIG. 7A depicts example positions of two NGSO satellites with respect to a GSO satellite and the earth.

Referring also to the example depiction 700 of FIG. 7A, a first NGSO satellite 300A is depicted as directing beam 612A towards a first coverage area 613A on the Earth's surface, and a second NGSO satellite 300B is depicted as directing beam 612B towards a second coverage area 613B on the Earth's surface. For actual implementations, the NGSO satellites 300A and/or 300B may each transmit any number of beams, and one or more of the beams may be directed towards overlapping regions on the Earth's surface. As used herein, the footprint of a satellite is the surface area (on Earth) within which all UTs can communicate with the satellite (above a minimum elevation angle). The area covered by a beam transmitted (e.g., from a corresponding antenna) of the satellite is referred to herein as the beam coverage area. Thus, the footprint of a satellite may be defined by a number of beam coverage areas provided by a number of beams transmitted from the satellite.

More specifically, for the example of FIG. 7A, considering the second NGSO satellite 300B, the second NGSO satellite 300B may determine, for each point within the coverage areas of its beams on the Earth's surface (as an example, the coverage area 613B of the beam 612B), an angle between a first line extending from the point on Earth to the second NGSO satellite 300B and each of a plurality of second lines extending from the point on Earth to positions along the GSO arc 640 (e.g., the positions along the GSO arc 640 corresponding to possible locations of GSO satellites). For simplicity, the first and second lines are not shown in FIG. 7A. The determined angles may be referred to herein as the "arc angles ($\alpha$)." Then, for the point on Earth, a minimum of the arc angles may be determined. This process may be repeated for all points within the coverage areas of the beams of second NGSO satellite 300B. Then, if the minimum arc angles are less than a threshold angle (e.g., 2°) for any point on Earth 630 within the beam coverage areas, the second NGSO satellite 300B may disable its interfering beams to avoid potential interference with GSO satellite communications.

Figure 7B:
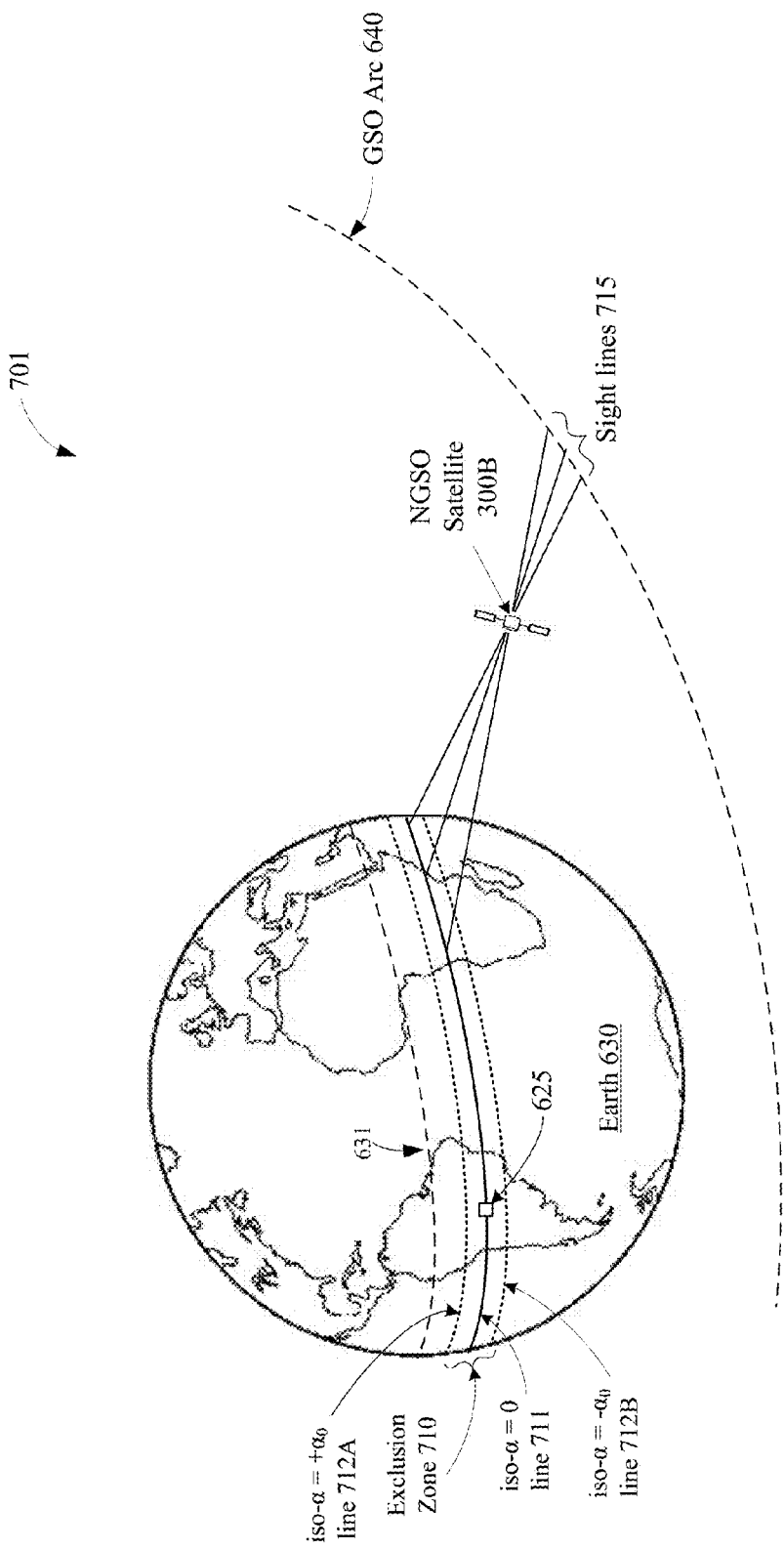
FIG. 7B depicts an example exclusion zone that may be defined in accordance with the ITU's guidelines on EPFD limits.

The determined arc angles may correspond to an exclusion zone defined in accordance with the ITU's guidelines on EPFD limits for NGSO satellites. For example, FIG. 7B shows a diagram 701 depicting an example exclusion zone 710 that may be defined, in accordance with the ITU's guidelines on EPFD limits, for the example GSO ground station 625. From the field of view of the second NGSO satellite 300B, three iso-$\alpha$ lines 711 and 712A-712B may be "drawn" on the surface of Earth 630. Each of the iso-$\alpha$ lines 711 and 712A-712B may represent points on the surface of Earth 630 that share the same value of the arc angle $\alpha$. More specifically, a first iso-$\alpha$ line 711 may represent points on the surface of Earth 630 for which $\alpha=0$. The first iso-$\alpha$ line 711 may be defined by a plurality of sight lines 715 extending from points on the GSO arc 640 through NGSO satellite 300B to points on Earth 630. The points on Earth corresponding to sight lines 715 may then be used to define the first iso-$\alpha$ line 711 (e.g., for which the value of $\alpha=0$). A second iso-$\alpha$ line 712A may represent points on the surface of Earth 630 for which $\alpha=+\alpha_0$, and a third iso-$\alpha$ line 712B may represent points on the surface of Earth 630 for which $\alpha=-\alpha_0$. The value of $\alpha_0$, which may be the threshold angle described above with respect to FIG. 7A, may correspond to a specified EPFD limit. In some aspects, the specified EPFD limit may be approximately −160 dB (W/m$^2$) within a specified bandwidth (e.g., within a bandwidth corresponding to at least part of the frequency spectrum used by GSO satellites). The exclusion zone 710 may then be defined as the surface area on Earth 630 lying between the "boundary" iso-$\alpha$ lines 712A-712B. Accordingly, points on Earth 630 that lie within the exclusion zone 710 may experience an EPFD value equal to or greater than the specified EPFD limit (e.g., equal to or greater than −160 dB).

Per the ITU's guidelines on EPFD limits for NGSO satellites, the second NGSO satellite 300B is to disable any of its beams when one or more points on Earth see the second NGSO satellite 300B within the threshold angle $\alpha_0$ of the GSO arc 640 (e.g., for points lying within the exclusion zone 710). In other words, according to at least one conventional interference mitigation technique to comply with the ITU's EPFD limits on NGSO satellite transmissions, if the −160 dB PFD contour of a beam transmitted from the second NGSO satellite 300B overlaps the exclusion zone 710, then the second NGSO satellite 300B is to turn off the beam. As used herein, a beam's PFD contour may indicate a portion of the beam's coverage area on Earth for which the beam's PFD is greater than or equal to a specified EPFD limit Thus, for example, a beam's −160 dB PFD contour may refer to the coverage area on Earth for which the beam's PFD is greater than or equal to −160 dB.

Although turning off a beam transmitted from the second NGSO satellite 300B when its −160 dB PFD contour touches one or more of the iso-α lines of a GSO earth station (e.g., when a portion of the beam's −160 dB PFD contour falls within the exclusion zone 710) may meet the ITU's $100^{th}$ percentile limits, this conventional interference mitigation technique may not comply with other EPFD percentile limits More specifically, the ITU has adopted a number of different EPFD percentile limits (e.g., in addition to the $100^{th}$ percentile limit described above), and all such EPFD percentile limits should be satisfied by NGSO satellites such as NGSO satellites 300A-300H of FIG. 6. For example, the ITU's various EPFD percentile limits may be classified into 4 groups based, at least in part, on the antenna dish sizes associated with GSO earth stations: a first group of EPFD percentile limits is based upon an antenna dish size of 60 cm, a second group of EPFD percentile limits is based upon an antenna dish size of 120 cm, a third group of EPFD percentile limits is based upon an antenna dish size of 300 cm, and a fourth group of EPFD percentile limits is based upon an antenna dish size of 1000 cm.

Moreover, disabling one or more beams of second NGSO satellite 300B in the manner described above with respect to FIGS. 7A-7B does not take into account other factors that, if considered, may indicate that one or more beams of the second NGSO satellite 300B do not exceed the EPFD limits and/or may not actually interfere with GSO satellite communications. For example, if the transmit power of a beam from the second NGSO satellite 300B is below a threshold level, then the beam may not interfere with the GSO satellite 621A's communications even when all of the determined arc angles are less than the threshold angle (e.g., even when the beam's coverage area lies within the exclusion zone 710). Because disabling the beam may create a gap in the NGSO satellite constellation 610's coverage area on earth 630, it would be desirable to meet the EPFD limits without automatically disabling an NGSO satellite beam when the beam's PFD contour touches an exclusion zone (e.g., the exclusion zone 710 of FIG. 7B).

In accordance with example implementations, the NGSO satellite constellation 610 may comply with all ITU EPFD percentile limits by selectively reducing the power of one or more beams transmitted from one or more satellites 300 of the NGSO satellite constellation 610 in a manner that ensures compliance with the ITU's EPFD limits while minimizing coverage gaps and/or minimizing capacity reductions associated with reducing the transmit power of the beams. More specifically, for at least some example implementations, the power level of each beam transmitted from the NGSO satellites 300 may be dynamically adjusted (e.g., reduced) according to a beam power back-off schedule. In some aspects, the beam power back-off schedule may specify a power profile for each beam as a function of latitude, for example, so that the power level of each beam transmitted from a respective NGSO satellite 300 may be selectively adjusted based on the latitudinal position of the sub-satellite point of the respective NGSO satellite 300. As explained in more detail below, the beam power back-off schedule may be determined by calculating a Cumulative Distribution Function (CDF) of EPFD levels that would be measured at each of a number of locations on Earth (e.g., as a result of transmitting a number of beams from a given one of the satellites 300 of the NGSO satellite constellation 610), and then adjusting the beam power levels as a function of latitudinal position of the given satellite's sub-satellite point to avoid violations of the ITU's EPFD percentile limits Once determined, the beam power back-off schedule may be employed by each of the satellites 300 in the NGSO satellite constellation 610 to dynamically adjust the power level of its beams, as a function of latitudinal position of its sub-satellite point, in a manner that maximizes beam power without violating any of the ITU's EPFD percentile limits.

Maximizing beam power is important to avoid coverage gaps and undesirable reductions in capacity, especially in portions of the Earth's surface near the equator 631 (referring again to FIGS. 6 and 7A-7B). Indeed, because points along the Earth's equator 631 are in-line with the GSO arc 640, an NGSO satellite whose sub-satellite point is approaching the equatorial latitudes (e.g., between approximately 10 degrees and −10 degrees) is likely to have a PFD contour that exceeds the ITU's EPFD limits Conversely, as an NGSO satellite's sub-satellite point moves away from the equatorial latitudes, the values of the arc angle α for various points on the Earth's surface typically increases. Thus, in general, the beam power back-off schedule disclosed herein may increase the beam power levels of an NGSO satellite as its sub-satellite point moves to higher latitudes, and may decrease the beam power levels of the NGSO satellite as its sub-satellite point moves to lower latitudes.

Figure 8A:
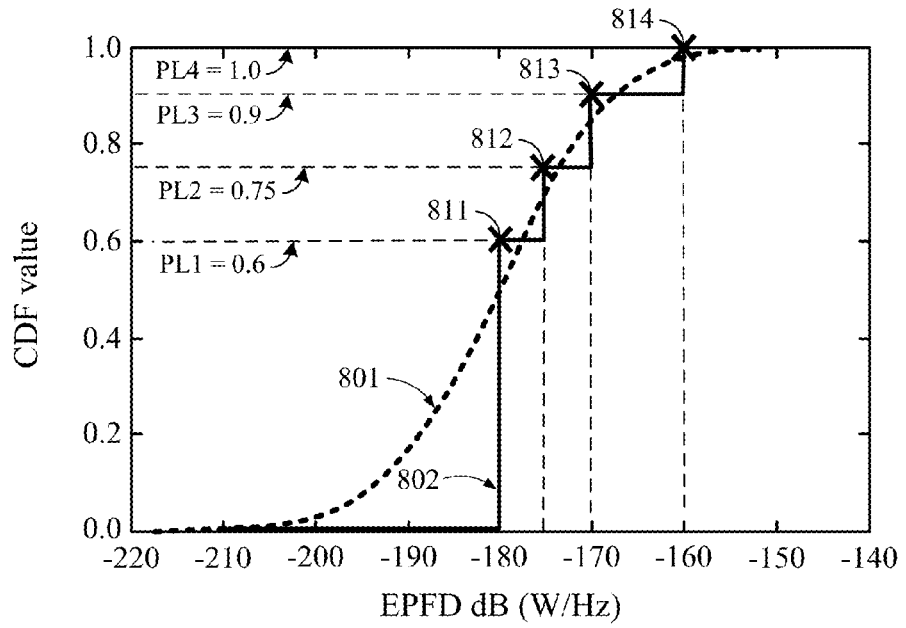
FIG. 8A depicts an example CDF-EPFD curve for an NGSO satellite beam received at a point on Earth.

FIG. 8A shows a graph 800 depicting an example CDF-EPFD curve 801 for an NGSO satellite beam received at a selected point or location on Earth (e.g., received at a possible location on Earth by a GSO earth station). The selected location on Earth may correspond to a latitude of the NGSO satellite 300's sub-satellite point on Earth. The EPFD levels are expressed in decibels (dB) on the x-axis, and the CDF value is expressed as a probability value (e.g., ranging from 0.0 to 1.0) on the y-axis. In some aspects, a corresponding percentile value may be determined by multiplying the probability value by 100. The CDF value represents, for each EPFD level, the number of simulation time-steps for which the EPFD level was exceeded, normalized by the total number of simulation time-steps. In other words, for any given EPFD level, the corresponding CDF value may indicate the percentage of time during which the given EPFD level at the selected location on Earth is exceeded by the NGSO satellite beam. Thus, for example implementations, the CDF-EPFD curve 801 may represent a determined CDF of EPFD levels associated with reception of a beam, to be transmitted from a selected NGSO satellite 300, at a corresponding location on Earth 630.

The four points 811-814 on graph 800 may indicate violations of four example EPFD percentile limits (PL1-PL4, respectively) specified by the ITU. For illustrative purposes, a composite step function 802 depicted as passing through each of the four points 811-814 may indicate, for each of the four points 811-814, the ENT) value and the CDF value at the selected location on Earth for a corresponding EPFD percentile limit. For one example, point 814 may indicate a $100^{th}$ percentile limit (e.g., PL4=1.0) for an EPFD value of −160 dB, which means that the NGSO satellite beam must have an EPFD level less than −160 dB at all times (e.g., 100% of the time). Point 813 may indicate a $90^{th}$ percentile limit (e.g., PL3=0.9) for an EPFD value of −170 dB, which means that the NGSO satellite beam must have an EPFD level less than −170 dB at least 90% of the time. Point 812 may indicate a $75^{th}$ percentile limit (e.g., PL2=0.75) for an EPFD value of −175 dB, which means that the NGSO satellite beam must have an EPFD level less than −175 dB at least 75% of the time. Point 811 may indicate a $60^{th}$ percentile limit (e.g., PL1=0.6) for an EPFD value of −180 dB, which means that the NGSO satellite beam must have an EPFD level less than −180 dB at least 60% of the time.

As depicted in the graph 800, the CDF-EPFD curve 801 violates all four EPFD percentile limits PL1-PL4 because the EPFD value of the beam is greater than each of the corresponding EPFD limits PL1-PL4 (e.g., as indicated by the CDF-EPFD curve 801 being to the right of respective points 811-814 in the example graph 800). To maximize the beam power level without violating the EPFD percentile limits, the CDF-EPFD curve 801 may be modified so that the EPFD value of the beam is less than (or equal to) the EPFD limit for each of the four EPFD percentile limits PL1-PL4 (e.g., relative to points 811-814, respectively).

Figure 8B:
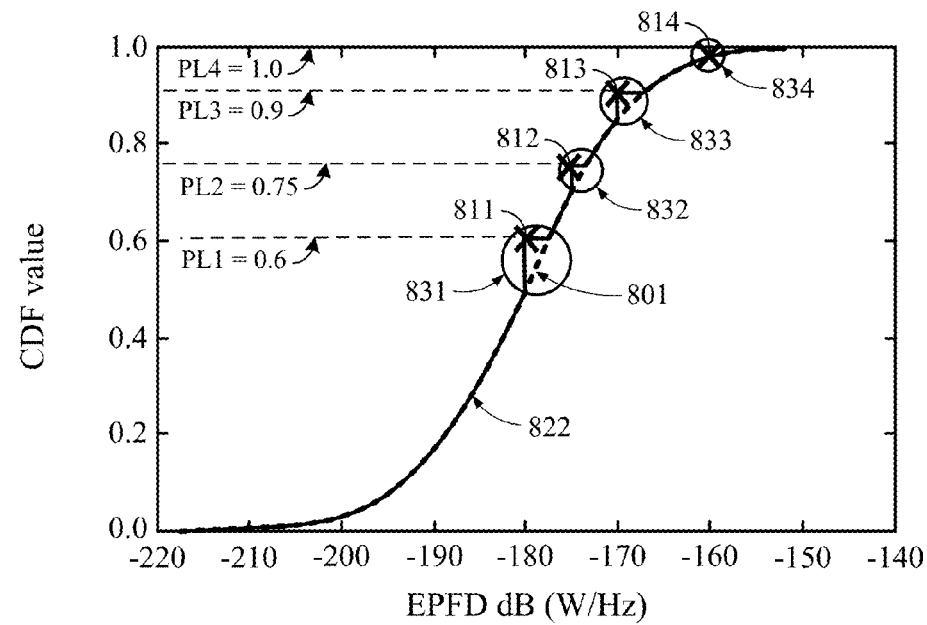
FIG. 8B depicts an example modified CDF-EPFD curve for the NGSO satellite beam, in accordance with example implementations.

FIG. 8B shows a graph 820 depicting an example modified CDF-EPFD curve 822, in accordance with example implementations. As described below, the modified CDF-EPFD curve 822 may represent a desired or target CDF of EPFD levels associated with reception of the beam at the selected location on Earth. In some aspects, determination of the modified CDF-EPFD curve 822 may be based, at least in part, on the EPFD percentile limits PL1-PL4 identified to have been violated by the "original" CDF-EPFD curve 801 of FIG. 8A. More specifically, as depicted in FIG. 8B, the modified CDF-EPFD curve 822 may be determined by modifying the CDF-EPFD curve 801 of FIG. 8A so that each of the points 811-814 is no longer to the left of the modified CDF-EPFD curve 822 (e.g., so that the modified CDF-EPFD curve 822 does not violate any of the four EPFD percentile limits PL1-PL4). Thus, the modified CDF-EPFD curve 822 is similar to the original CDF-EPFD curve 801 of FIG. 8A, except that the modified CDF-EPFD curve 822 follows portions of the composite step function 802 that pass through the four points 811-814 corresponding to the four EPFD percentile limits PL1-PL4, respectively. In other words, the modified CDF-EPFD curve 822 of FIG. 8B may be determined by modifying the CDF-EPFD curve 801 of FIG. 8A to include at least portions of composite step function 802 that pass through the four points 811-814.

More specifically, for at least some example implementations, the composite step function 802 may be defined to include a number of individual step functions 831-834. Each of the individual step functions 831-834 may be defined for a corresponding one of the EPFD percentile limits PL1-PL4 violated by the original CDF-EPFD curve 801, for example, by passing through a corresponding one of the four points 811-814 in the graph 800. For example, the modified CDF-EPFD curve 822 includes a first step function 831 associated with the first point 811 so that the beam's EPFD level no longer violates the first EPFD percentile limit PL1. Thus, the beam's power level may be reduced from EPFD levels indicated by CDF-EPFD curve 801 to EPFD levels indicated by modified CDF-EPFD curve 822 based on the first step function 831, for example, so that the beam's EPFD level does not violate the first EPFD percentile limit PL1 corresponding to the first point 811.

In a similar manner, the modified CDF-EPFD curve 822 includes a second step function 832 associated with the second point 812 so that the beam's EPFD level no longer violates the second EPFD percentile limit PL2, includes a third step function 833 associated with the third point 813 so that the beam's EPFD level no longer violates the third EPFD percentile limit PL3, and includes a fourth step function 834 associated with the fourth point 814 so that the beam's EPFD level no longer violates the fourth EPFD percentile limit PL4.

Thus, as depicted in FIG. 8B, the four step functions 831-834 defined within the modified CDF-EPFD curve 822 may be used to determine a number of beam power back-off values that, when used to adjust the beam's transmit power level, may ensure compliance with the EPFD percentile limits PL1-PL4.

A number of additional modified CDF-EPFD curves may be determined, in a manner similar to that of modified CDF-EPFD curve 822, for a number of different locations on Earth (e.g., corresponding to a number of different latitudes of the NGSO satellite 300's sub-satellite point). The resulting collection of modified CDF-EPFD curves 822 may be compiled to derive or determine a beam power back-off schedule that achieves maximum allowable power levels for the beam, without violating any of the ITU's EPFD percentile limits, for all latitudes on Earth (e.g., for all locations of the NGSO satellite 300 along its orbit around Earth. Thus, for at least some example implementations, the beam's power back-off schedule may be expressed as a function of latitude (e.g., of the NGSO satellite 300's sub-satellite point).

The process described above with respect to FIGS. 8A-8B may be repeated to determine a beam power back-off schedule for each beam to be transmitted from the NGSO satellite 300. The resulting collection of beam power back-off schedules may be compiled or combined to determine a composite beam power back-off schedule for all the beams to be transmitted from the NGSO satellite 300.

Figure 8C:
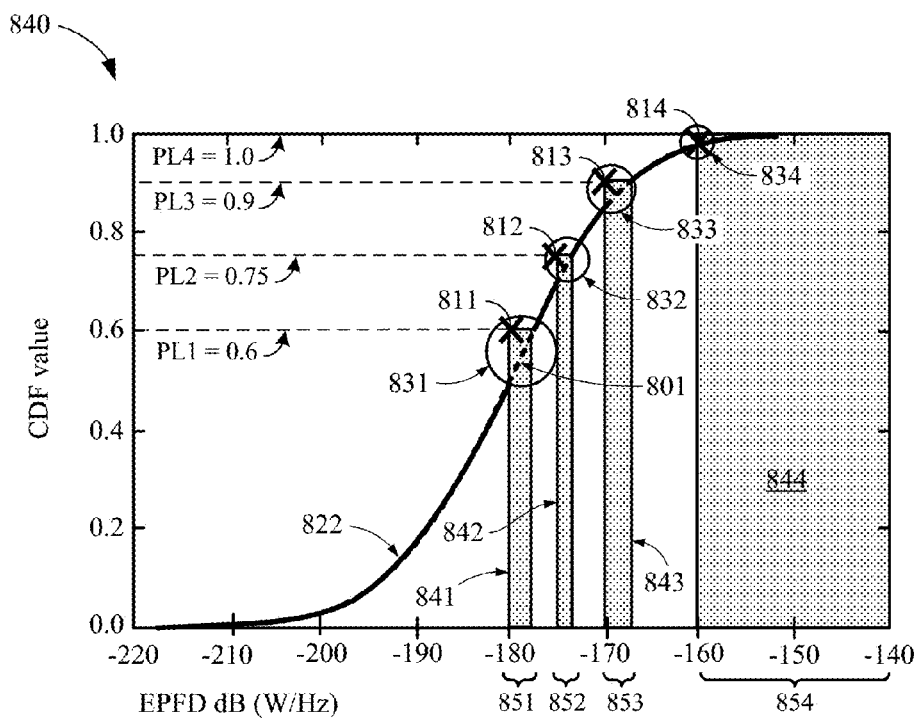
FIG. 8C depicts example EPFD intervals associated with the modified CDF-EPFD curve of FIG. 8B, in accordance with example implementations.

FIG. 8C shows a graph 840 depicting four EPFD intervals 841-844 associated with the four violated EPFD percentile limits PL1-PL4. At least some example implementations may define the four EPFD intervals 841-844 based, at least in part, on the four step functions 831-834 of the modified CDF-EPFD curve 822. The EPFD intervals 841-844 may be used to indicate when (and by how much) a given beam's power level is to be reduced so that the ITU's EPFD percentile limits are not violated. More specifically, the first EPFD interval 841 corresponds to the first EPFD percentile limit PL1 associated with the first point 811, and may be defined by projecting the horizontal portion of the first step function 831 onto the horizontal axis, for example, so that the first EPFD interval 841 includes a first range 851 of EPFD values (in dB). Once defined, the first EPFD interval 841 may be used to ensure that the given beam's PFD does not violate the first EPFD percentile limit PL1.

Similarly, the second EPFD interval 842 corresponds to the second EPFD percentile limit PL2 associated with the second point 812, and may be defined by projecting the horizontal portion of the second step function 832 onto the horizontal axis, for example, so that the second EPFD interval 842 includes a second range 852 of EPFD values (in dB). Once defined, the second EPFD interval 842 may be used to ensure that the given beam's PFD does not violate the second EPFD percentile limit PL2. The third EPFD interval 843 corresponds to the third EPFD percentile limit PL3 associated with the third point 813, and may be defined by projecting the horizontal portion of the third step function 833 onto the horizontal axis, for example, so that the third EPFD interval 843 includes a third range 853 of EPFD values (in dB). Once defined, the third EPFD interval 843 may be used to ensure that the given beam's PFD does not violate the third EPFD percentile limit PL3. The fourth EPFD interval 844 corresponds to the fourth EPFD percentile limit PL4 associated with the fourth point 814, and may be defined by projecting the horizontal portion of the fourth step function 834 onto the horizontal axis, for example, so that the fourth EPFD interval 844 includes a fourth range 854 of EPFD values (in dB). Once defined, the fourth EPFD interval 844 may be used to ensure that the given beam's PFD does not violate the fourth EPFD percentile limit PL4.

When the EPFD of a beam transmitted from NGSO satellite 300 falls within one of the EPFD intervals 841-844, the beam may violate a corresponding one of the four EPFD percentile limits PL1-PL4, respectively. To avoid these EPFD percentile limit violations, the beam's PFD may be reduced to the minimum EPFD value of the associated EPFD interval. For one example, if the beam's PFD falls within the first EPFD interval 841, then violation of the first EPFD percentile limit PL1 may be avoided by reducing the beam's PFD value to approximately −180 dB (which is the minimum value of the range 851 of ENT) values associated with the first EPFD interval 841). For another example, if the beam's PFD falls within the second EPFD interval 842, then violation of the second EPFD percentile limit PL2 may be avoided by reducing the beam's PFD value to approximately −175 dB (which is the minimum value of the range 852 of EPFD values associated with the second EPFD interval 842). Similarly, if the beam's PFD falls within the third EPFD interval 843, then violation of the third EPFD percentile limit PL3 may be avoided by reducing the beam's PFD value to approximately −170 dB (which is the minimum value of the range 853 of EPFD values associated with the third EPFD interval 843). Lastly, if the beam's PFD falls within the fourth EPFD interval 844, then violation of the fourth EPFD percentile limit PL4 may be avoided by reducing the beam's PFD value to approximately −160 dB (which is the minimum value of the range 854 of EPFD values associated with the fourth EPFD interval 844). In this manner, reducing the beam's PFD based at least in part on the defined EPFD intervals 841-844 may ensure that the CDF associated with the beam does not violate any of the EPFD percentile limits.

The beam's PFD may be reduced by decreasing the beam's transmit power level. Thus, to achieve the maximum allowable power level of a beam without violating the ITU's EPFD limits, the beam's power level may be dynamically adjusted using a beam power back-off schedule determined in accordance with the example implementations. As described above, the beam power back-off schedule may be based, at least in part, on EPFD intervals 841-844 depicted in FIG. 8C. Further, because GSO satellites are located on the GSO arc 640 (and thus may have sub-satellite points along the Earth's equator), the beam power back-off value applied by the NGSO satellite 300 (e.g., the amount by which a beam's power level is to be reduced so that the beam does not violate the EPFD percentile limits) may be expressed as a function of latitude of the NGSO satellite 300's sub-satellite point.

More specifically, the beam power back-off value may be denoted herein as "β," and the actual transmit power of the beam may be calculated by multiplying the beam's full power level by the beam power back-off value, as indicated below by equation 1 (EQ. 1):

$$PWR_{FULL} * \beta = PWR_{ACTUAL} \quad (EQ. 1)$$

The value of β may be optimized so that the corresponding NGSO satellite 300 radiates a maximum amount of energy without resulting in a violation of any of the EPFD percentile limits. This maximum amount of energy may be expressed as shown below in equation 2 (EQ. 2), where i denotes a latitude of a possible NGSO satellite's sub-satellite point in degrees:

$$\Sigma_{i=-90}^{90} \beta i \quad (EQ. 2)$$

The set of constraints should address possible EPFD violations at all points on Earth for all beams transmitted from all possible locations of all the NGSO satellites 300 in the NGSO satellite constellation 610. Because calculating a complete set of such constraints may be impractical, some implementations may identify a finite set of constraints that collectively defines the boundaries of the EPFD intervals as a function of latitude (e.g., for NGSO satellite positions at all latitudes on Earth).

For other implementations, the beam power back-off schedule may be derived using a time sweep technique. More specifically, operation of the NGSO satellite constellation 610 may be simulated for a finite number of time intervals (e.g., 2160 time intervals) each having a fixed time duration (e.g., 3 seconds per time interval) with all beams transmitting at full power. During each time interval (or at a beginning of each time interval), all possible locations of GSO earth stations are checked for violations of the EPFD percentile limits. All violations detected during this initial simulation may be recorded, and thereafter used to determine the EPFD intervals described above with respect to FIG. 8C. For some implementations, the violations and/or the determined EPFD intervals may be used to calculate values of β for each degree of latitude. The values of β for various latitudes may be expressed as a power back-off vector (β-vector). For some implementations, the β-vector may include 181 components, each corresponding to a different latitude with one degree granularity (e.g., from −90 degrees latitude to +90 degrees latitude).

Once the EPFD intervals and the β-vector are determined, operation of the NGSO satellite constellation 610 is simulated again—this time adjusting the beam power levels according to the β-vector—to verify that each beam's PFD does not violate any of the EPFD percentile limits More specifically, during this "verification" simulation, the beam power level is adjusted according to the β-vector, for example, so that the beam's PFD is reduced by a corresponding power back-off value (β value) when the beam's PFD falls within one of the EPFD intervals. In this manner, the β-vector, which may embody the beam power back-off schedule, may indicate a maximum power level of a given beam, as a function of latitude, that does not violate any of the EPFD percentile limits. This process may be repeated to determine a beam power back-off schedule for each beam transmitted from satellites 300 associated with the NGSO satellite constellation 610.

Figure 9A:
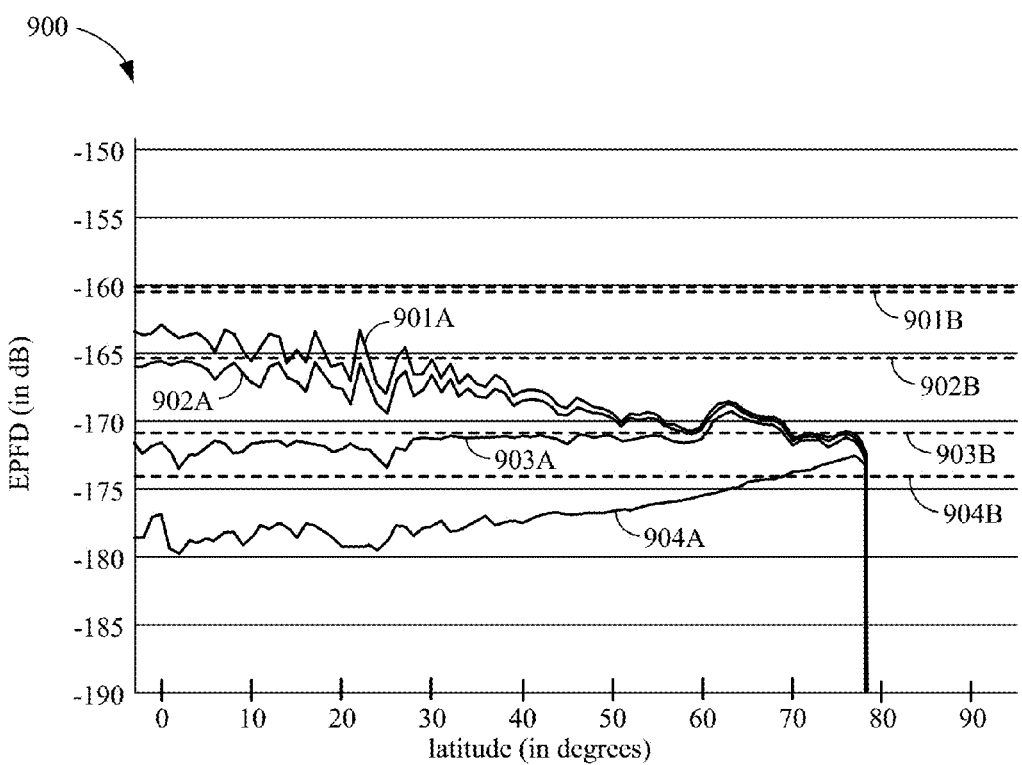
FIG. 9A depicts levels of compliance with various example EPFD percentile limits achieved by beam power back-off schedules in accordance with example implementations.

In addition, other operational characteristics (e.g., coverage gaps and spatial capacity) may be determined using the verification simulation. For example, FIG. 9A is a graph 900 depicting levels of compliance with various example EPFD percentile limits, as a function of latitude, that may be achieved by dynamically adjusting the power levels of beams transmitted from the NGSO satellites 300 using beam power back-off schedules derived in accordance with example implementations. The graph 900 may be based on a circular Venetian blind antenna pattern with a statistical mask. A first curve 901A indicates the EPFD levels associated with a 99.991 percentile limit, which is within the 99.991 percentile limit indicated by dashed line 901B for all latitudes. A second curve 902A indicates the EPFD levels associated with a 99.73 percentile limit, which is within the 99.73 percentile limit indicated by dashed line 902B for all latitudes. A third curve 903A indicates the EPFD levels associated with a 99 percentile limit, which is within the 99 percentile limit indicated by dashed line 903B for all latitudes except between approximately 60 and 70 degrees. A fourth curve 904A indicates the EPFD levels associated with a 90 percentile limit, which is within the 90 percentile limit indicated by dashed line 904B for all latitudes except between approximately 70 and 80 degrees.

It is noted that at latitudes between approximately 0 and 30 degrees, the 99.73-percentile limit indicated by dashed line 902B is the binding limit, while at latitudes above 30 degrees, the 99-percentile limit indicated by dashed line 903B is binding. Thus, as depicted in the graph 900 of FIG. 9A, all EPFD percentile limits are met by application of beam power back-off schedules in accordance with the example implementations.

Figure 9B:
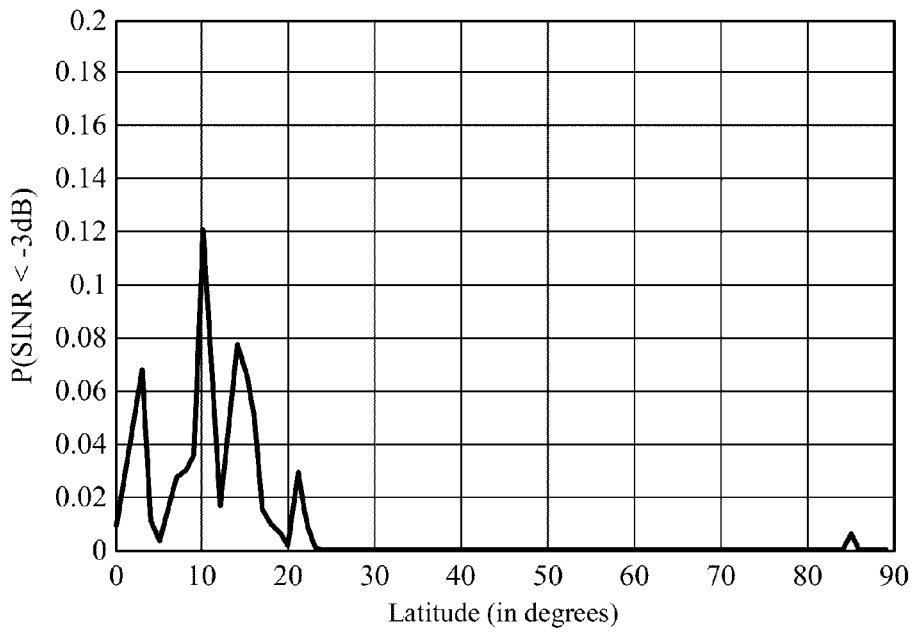
FIG. 9B depicts a relationship between coverage gaps of an example NGSO satellite constellation and latitudes on Earth.
Figure 9C:
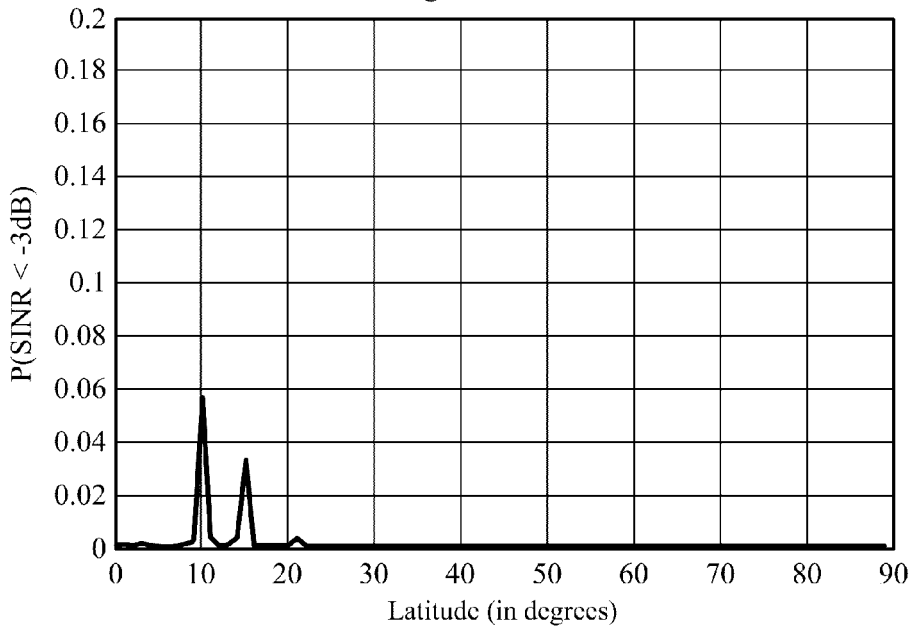
FIG. 9C depicts another relationship between coverage gaps of an example NGSO satellite constellation and latitudes on Earth.

FIG. 9B shows a graph 910 depicting a relationship between coverage gaps of the example NGSO satellite constellation 610 and latitudes on Earth 630 when outage is based on the signal-to-noise-interference-ratio (SINR) being less than −3 dB, and FIG. 9C shows a graph 920 depicting a relationship between coverage gaps of the example NGSO satellite constellation 610 and latitudes on Earth 630 when outage is based on the SINR being less than −6 dB. As depicted in graphs 910 and 920, a user terminal such as UT 400 positioned at latitudes on Earth between approximately 0 and 15 degrees may experience greater coverage gaps (e.g., outage) than a user terminal positioned at latitudes on Earth greater than approximately 15 degrees.

Figure 9D:
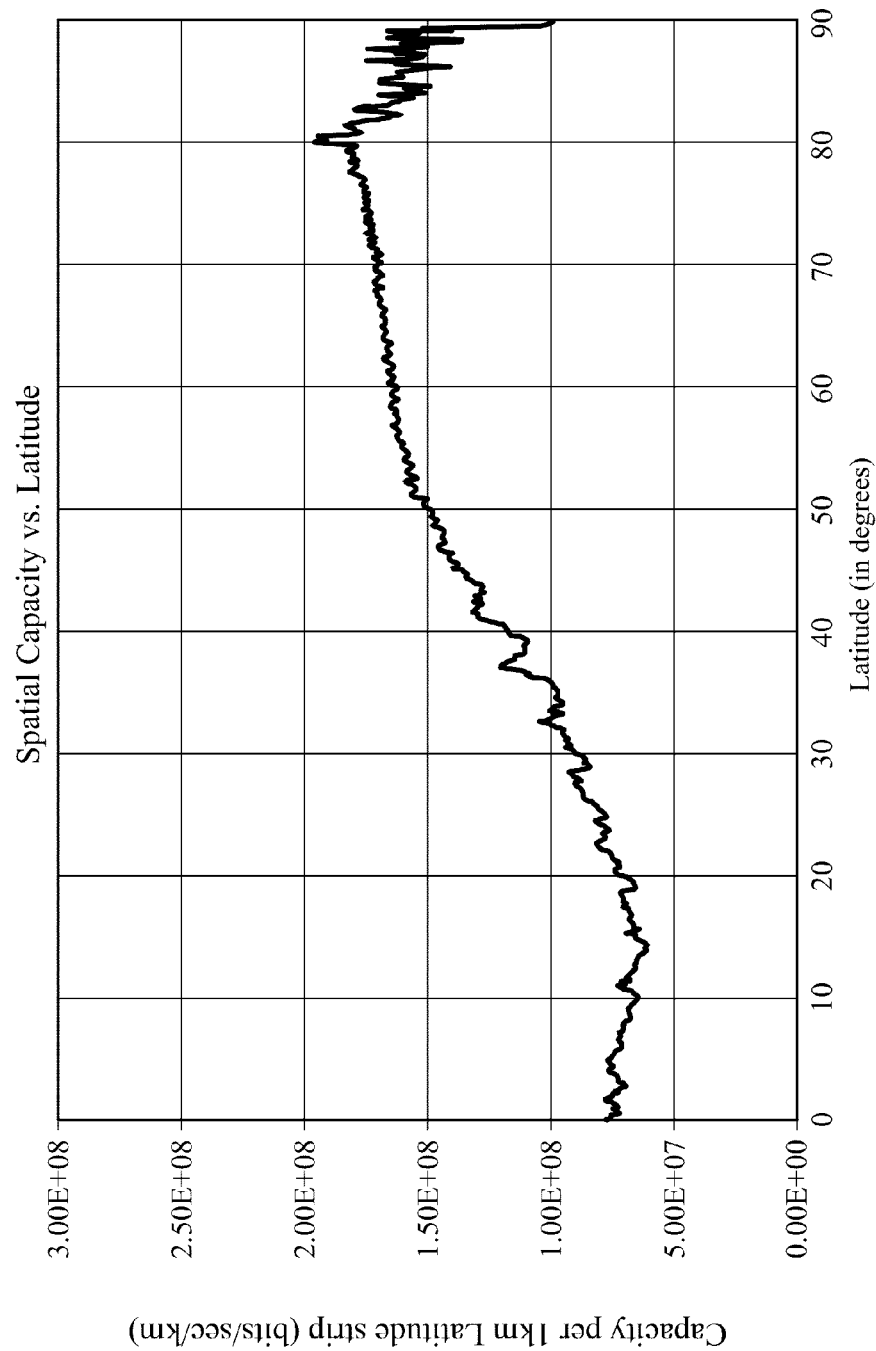
FIG. 9D depicts a relationship between spatial capacity of an example NGSO satellite constellation and latitudes on Earth.

FIG. 9D is a graph 940 that depicts a relationship between spatial capacity of the example NGSO satellite constellation 610 and latitudes on Earth 630. It is noted that the beam power back-off schedules of example implementations may provide a relatively high amount of capacity (e.g., bandwidth) for nearly all latitudes on Earth.

Figure 10A:
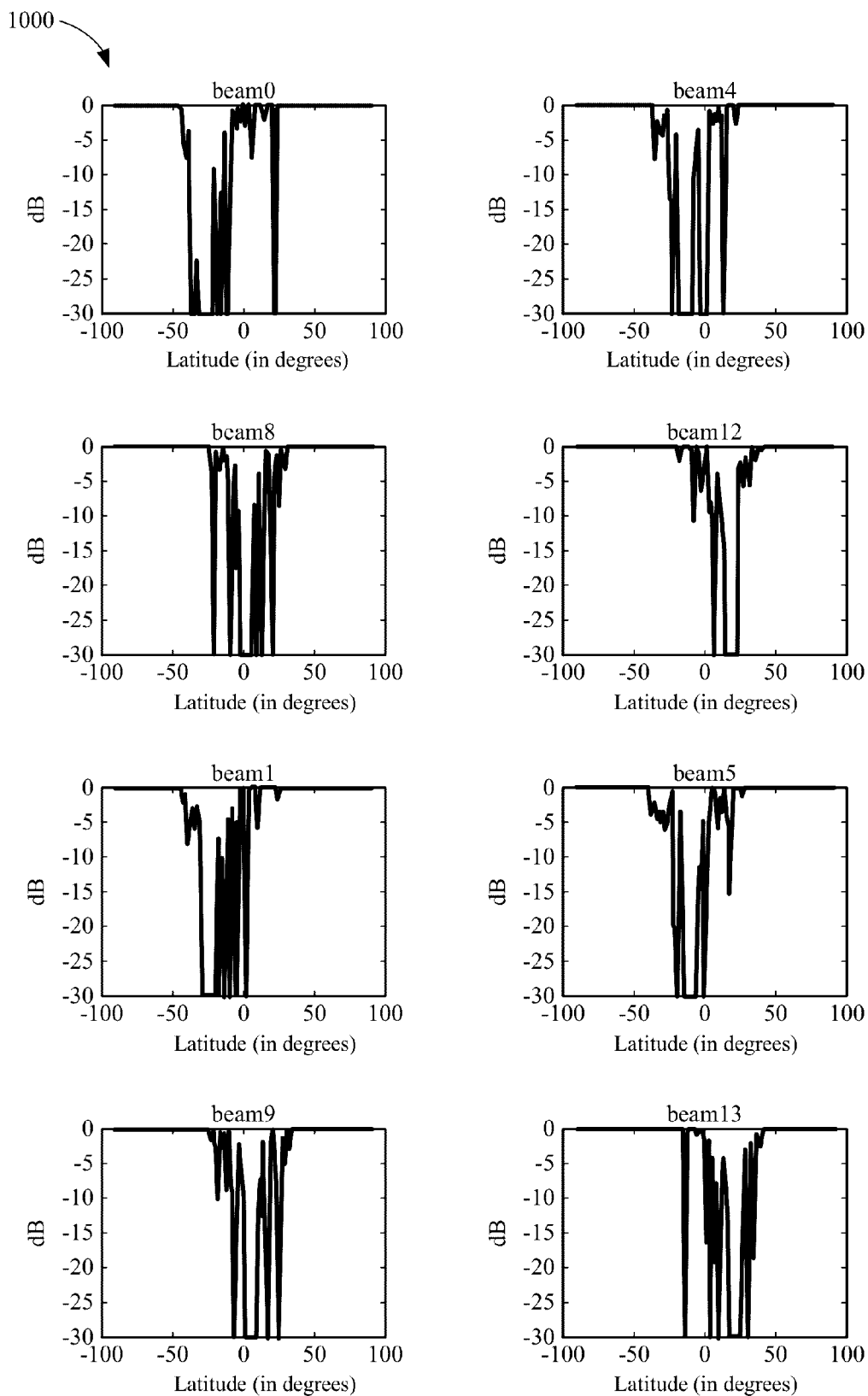
FIGS. 10A-10B depict example relationships between beam power levels and latitudes on Earth for 16 beams transmitted from an example NGSO satellite.
Figure 10B:
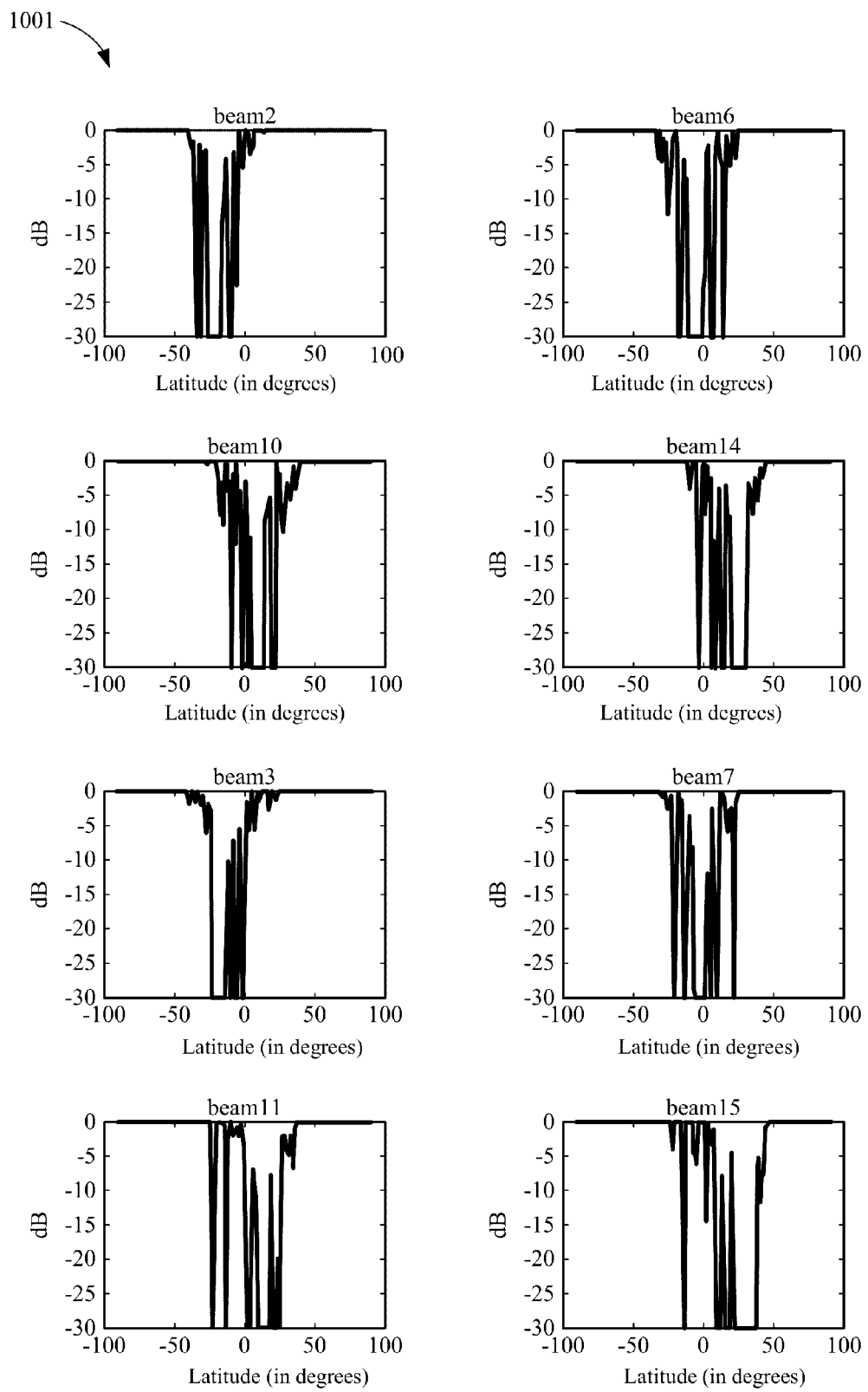

FIGS. 10A-10B show graphs 1000 and 1001 depicting example relationships between beam power levels and latitudes on Earth for 16 beams transmitted from an example NGSO satellite such as one of the NGSO satellites 300A-300H of FIG. 6.

Figure 11:
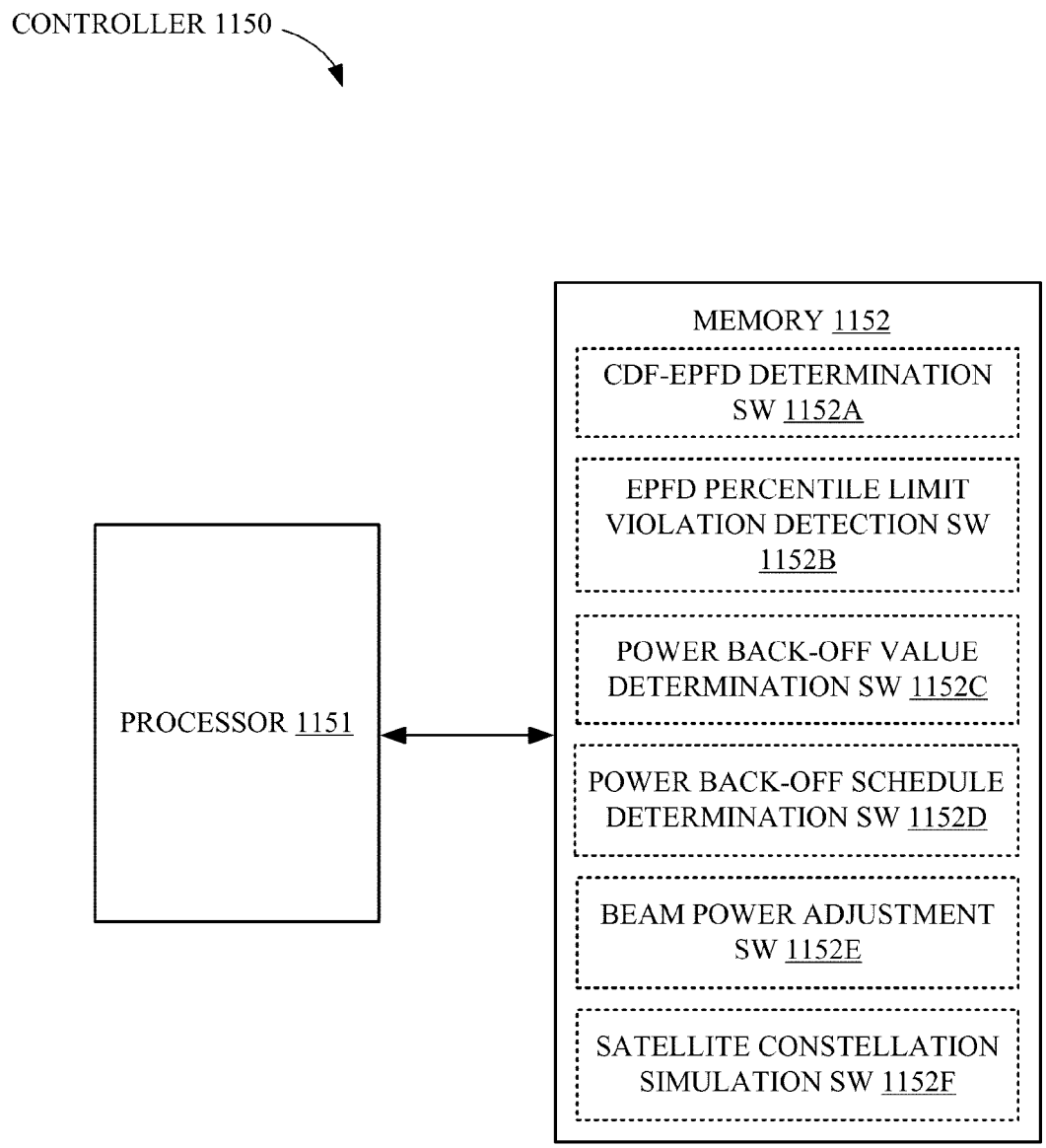
FIG. 11 shows a block diagram of an example controller that may be used to dynamically adjust the power level of one or more beams transmitted from each of a number of NGSO satellites disclosed herein.

FIG. 11 is a block diagram of an example controller 1150 in accordance with example implementations. For purposes of discussion herein, the controller 1150 may be an example of (or implemented within) the gateway controller 250 of FIG. 2 and/or the controller 340 of FIG. 3. For some implementations, the controller 1150 may perform the functions of the beam power control circuit 252 described above with respect to FIGS. 1-2. Alternatively or as an addition, the controller 1150 may be implemented within or coupled to the NCC and/or the SCC described above with respect to FIG. 2

Figure 12:
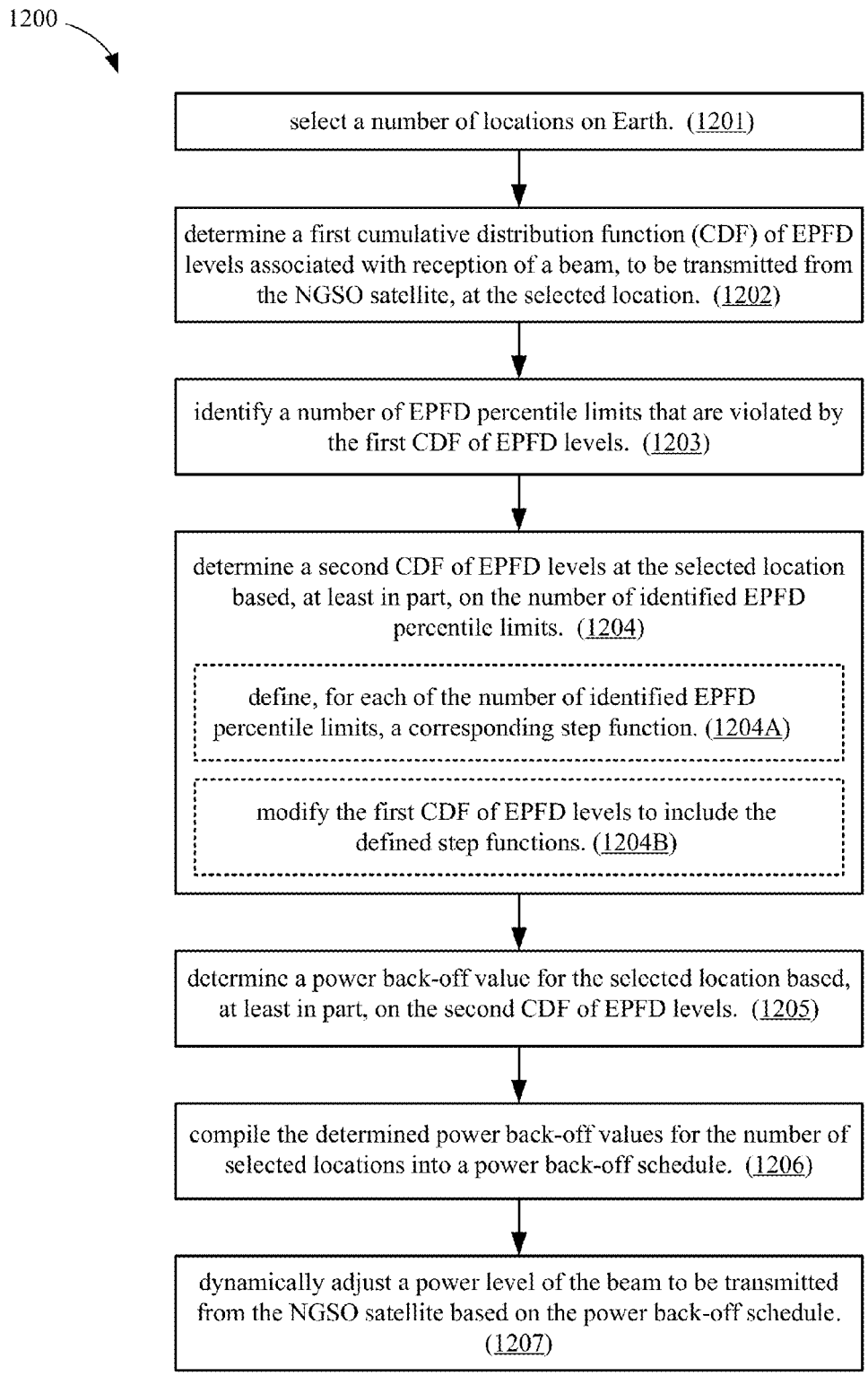
FIG. 12 shows an illustrative flowchart depicting an example operation for determining a power back-off schedule for one or more NGSO satellites disclosed herein.

The controller 1150 includes at least a processor 1151 and a memory 1152. The memory 1152 may include a non-transitory computer-readable storage medium (e.g., one or more nonvolatile memory elements, such as EPROM, EEPROM, Flash memory, a hard drive, and so on) that may store the following software modules (SW):

- a CDF-EPFD determination software module 1152A to determine a first CDF of EPFD levels at a selected location on Earth and to determine a second CDF of EPFD levels at the selected location based at least in part on EPFD percentile limits identified as being violated by the first CDF of EPFD levels, for example, as described for one or more operations of FIG. 12;
- an EPFD percentile limit violation detection software module 1152B to identify EPFD percentile limits that are violated by the first CDF of EPFD levels, for example, as described for one or more operations of FIG. 12;
- a power back-off value determination software module 1152C to determine power back-off values for each beam as a function of latitude, for example, as described for one or more operations of FIG. 12;
- a power back-off schedule determination software module 1152D to compile the determined power back-off values into the power back-off schedule for each beam to be transmitted from the satellite, for example, as described for one or more operations of FIG. 12;
- a beam power adjustment software module 1152E to dynamically adjust the power levels of beams transmitted from the satellite based on the power back-off schedule, for example, as described for one or more operations of FIG. 11; and
- a satellite constellation simulation software module 1152F to simulate an operation of the satellite constellation to detect violations of EPFD limits and/or to derive the power back-off schedule, for example, as described above.

Each software module includes instructions that, when executed by processor 1151, cause controller 1150 to perform the corresponding functions. The non-transitory computer-readable medium of memory 1152 thus includes instructions for performing all or a portion of the operations of FIG. 12.

Processor 1151 may be any suitable one or more processors capable of executing scripts or instructions of one or more software programs stored in controller 1150 (e.g., within memory 1152). For example, processor 1151 may execute the CDF-EPFD determination software module 1152A to determine the first CDF of EPFD levels at a selected location on Earth and to determine the second CDF of EPFD levels at the selected location based at least in part on a number of EPFD percentile limits identified as being violated by the first CDF of EPFD levels. Processor 1151 may also execute the EPFD percentile limit violation detection software module 1152B to identify the number of EPFD percentile limits that are violated by the first CDF of EPFD levels. Processor 1151 may also execute the power back-off value determination software module 1152C to determine power back-off values for each beam as a function of latitude. Processor 1151 may also execute the power back-off schedule determination software module 1152D to compile the determined power back-off values into the power back-off schedule for each beam to be transmitted from the satellite. Processor 1151 may also execute the beam power adjustment software module 1152E to dynamically adjust the power levels of beams transmitted from the satellite based on the power back-off schedule. Processor 1151 may also execute the satellite constellation simulation software module 1152F to simulate an operation of the satellite constellation to detect violations of EPFD limits and/or to derive the power back-off schedule.

For other implementations, one or more components of controller 1150 may be included within other suitable devices of satellite communication system 100 of FIG. 1. For example, one or more components of controller 1150 may be implemented in gateway 200 of FIG. 2 (or in another suitable device or system that is in control of, or at least in communication with, the NGSO satellites).

FIG. 12 is an illustrative flow chart depicting an example operation 1200 for operating a satellite such as NGSO satellite 300 to comply with equivalent power flux density (EPFD) limits. The example operation 1200 may be performed by the controller 1150 depicted in FIG. 11. However, it is to be understood that one or more portions of operation 1200 may be performed by other suitable controllers and/or by other suitable components of satellite 300 and/or gateway 200 (see also FIG. 2). For example, in some aspects, one or more portions of operation 1200 may be performed by the beam power control circuit 252 depicted in FIGS. 1-2.

First, a number of locations on Earth are selected (1201). The selected locations should form a dense geographic sampling on the Earth's surface to allow most, if not all, EPFD violations to be detected. Then, for each of the selected locations, the controller 1150 may determine a first cumulative distribution function (CDF) of EPFD levels associated with reception of a beam, to be transmitted from the NGSO satellite 300, at the selected location (1202). Thus, each of the selected locations may be associated with a corresponding one of the first CDF of EPFD levels.

Then, the controller 1150 may identify a number of EPFD percentile limits that are violated by the first CDF of EPFD levels (1203). The controller 1150 may determine a second CDF of EPFD levels at the selected location based, at least in part, on the number of identified EPFD percentile limits (1204). For example, each of the first CDFs may be compared with the set of EPFD percentile limits to determine the second CDF of EPFD levels, wherein a second CDF of EPFD levels may be determined for each reference antenna dish size of a GSO earth station. For some implementations, the controller 1150 may determine the second CDF of EPFD levels by defining, for each of the number of identified EPFD percentile limits, a corresponding step function (1204A), and then by modifying the first CDF of EPFD levels to include the defined step functions (1204B).

The controller 1150 may then determine a power back-off value for the selected location based, at least in part, on the second CDF of EPFD levels (1205). For some aspects, the second CDF of EPFD levels does not violate any of the number of identified EPFD percentile limits at the selected location.

Then, the controller 1150 may compile the determined power back-off values for the number of selected locations into a beam power back-off schedule (1206). Then, the controller 1150 may dynamically adjust the power level of the beam to be transmitted from the NGSO satellite 300 based on the power back-off schedule (1207). The power back-off schedule may represent the beam's power back-off values as a function of latitude. For some implementations, the power back-off schedule comprises a power back-off vector including 181 components, each component indicating the power back-off value for a corresponding one of latitudes −90 degrees to +90 degrees (including the equator). For other implementations, the power back-off vector may include a different number of components, for example, depending upon a desired level of granularity.

For some implementations, the controller 1150 may also define a number of EPFD intervals for each selected location based, at least in part, on the number of defined step functions, and then determine the power back-off value for the selected location based, at least in part, on the number of defined EPFD intervals. For example, each of the second CDFs may determine a number of EPFD intervals, which are then used to determine whether and by how much the EPFD limits are violated. Then, based on the collection of EPFD intervals, all violations are identified and recorded. From the collection of violations, the power back-off schedule, which is a vector of power back-off values specified, for example, for each degree of latitude, is computed such that the collection of violations are removed when the power back-off schedule is used to dynamically adjust the transmit power of the satellite beams. Note that the above operations may be performed for beams using the same frequency band. If multiple frequency bands are used, then the above operations may be performed for each frequency band.

Figure 13:
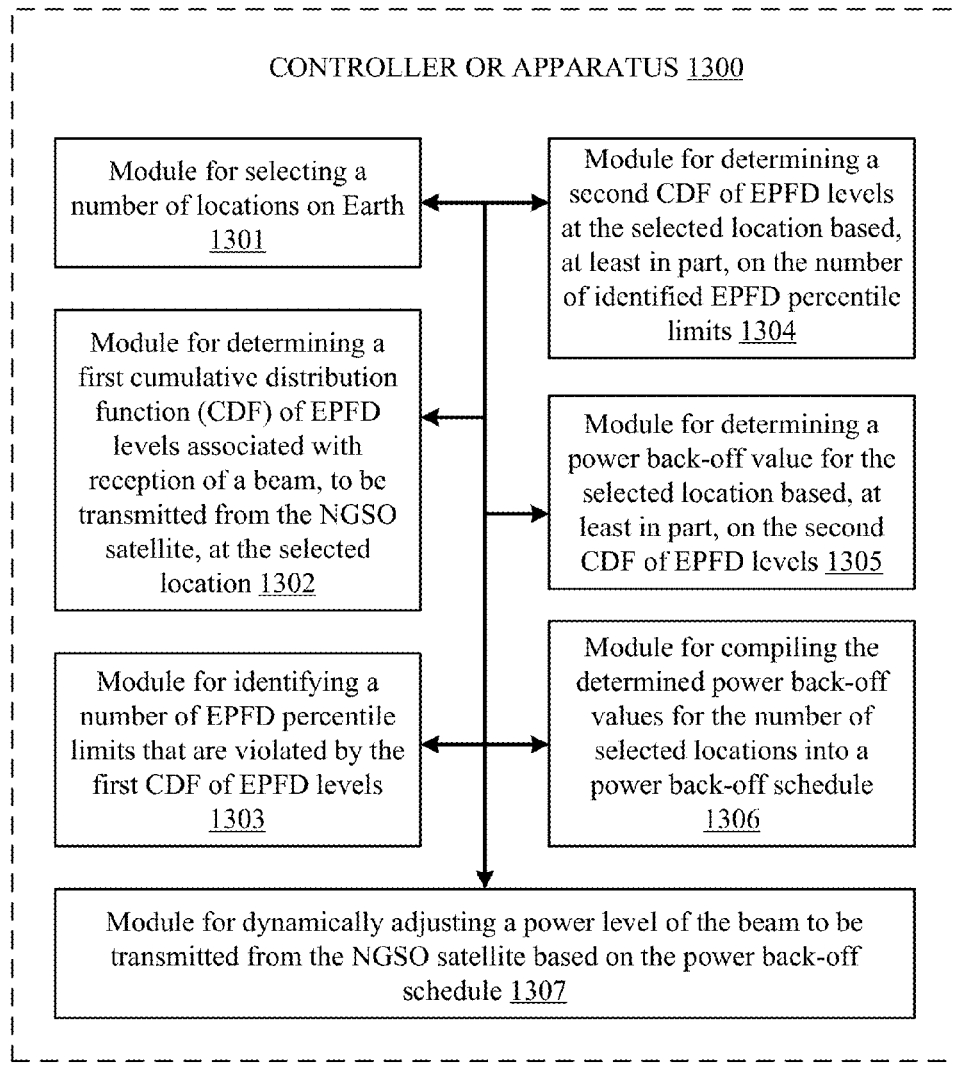
FIG. 13 is another block diagram of several sample aspects of apparatuses configured to support controlling satellite operations as taught herein.

FIG. 13 shows an example satellite or apparatus 1300 represented as a series of interrelated functional modules. A module 1301 for selecting a number of locations on Earth may correspond at least in some aspects to, for example, a processor as discussed herein (e.g., processor 1151). A module 1302 for determining a first cumulative distribution function (CDF) of EPFD levels associated with reception of a beam, to be transmitted from the NGSO satellite, at the selected location may correspond at least in some aspects to, for example, a processor as discussed herein (e.g., processor 1151). A module 1303 for identifying a number of EPFD percentile limits that are violated by the first CDF of EPFD levels may correspond at least in some aspects to, for example, a processor as discussed herein (e.g., processor 1151). A module 1304 for determining a second CDF of EPFD levels at the selected location based, at least in part, on the number of identified EPFD percentile limits may correspond at least in some aspects to, for example, a processor as discussed herein (e.g., processor 1151). A module 1305 for determining a power back-off value for the selected location based, at least in part, on the second CDF of EPFD levels may correspond at least in some aspects to, for example, a processor as discussed herein (e.g., processor 1151). A module 1306 for compiling the determined power back-off values for the number of selected locations into the power back-off schedule may correspond at least in some aspects to, for example, a processor as discussed herein (e.g., processor 1151). A module 1307 for dynamically adjusting the power level of the beam to be transmitted from the NGSO satellite based on the power back-off schedule may correspond at least in some aspects to, for example, a processor as discussed herein (e.g., processor 1151).

The functionality of the modules of FIG. 13 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 13, as well as other components and functions described herein, may be implemented using any suitable means. Such means also may be implemented, at least in part, using corresponding structure as taught herein. For example, the components described above in conjunction with the "module for" components of FIG. 13 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, one aspect of the disclosure can include a non-transitory computer readable media embodying a method for time and frequency synchronization in non-geosynchronous satellite communication systems. The term "non-transitory" does not exclude any physical storage medium or memory and particularly does not exclude dynamic memory (e.g., conventional random access memory (RAM)) but rather excludes only the interpretation that the medium can be construed as a transitory propagating signal.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method of operating a non-geosynchronous orbit (NGSO) satellite to comply with equivalent power flux density (EPFD) limits, the method comprising:
   for each of a number of selected locations on Earth:
   determining a first cumulative distribution function (CDF) of EPFD levels associated with reception of a beam, to be transmitted from the NGSO satellite, at the selected location;
   identifying a number of EPFD percentile limits that are violated by the first CDF of EPFD levels;
   determining a second CDF of EPFD levels at the selected location based, at least in part, on the number of identified EPFD percentile limits; and
   determining a power back-off value for the selected location based, at least in part, on the second CDF of EPFD levels;
   compiling the determined power back-off values for the number of selected locations into a power back-off schedule; and
   dynamically adjusting a power level of the beam to be transmitted from the NGSO satellite based on the power back-off schedule.

2. The method of claim 1, wherein the power back-off schedule represents the power back-off values as a function of latitude on Earth.

3. The method of claim 1, wherein the power back-off schedule comprises a vector including a number of components, each component indicating the power back-off value for a corresponding latitude on Earth.

4. The method of claim 1, wherein the second CDF of EPFD levels does not violate any of the number of identified EPFD percentile limits.

5. The method of claim 1, wherein determining the second CDF of EPFD levels comprises:
   defining, for each of the number of identified EPFD percentile limits, a corresponding step function; and
   modifying the first CDF of EPFD levels to include the defined step functions.

6. The method of claim 5, wherein each of the defined step functions is to avoid violating a corresponding one of the number of identified EPFD percentile limits, each of the identified EPFD percentile limits associated with a corresponding reference antenna dish size of a geosynchronous (GSO) earth station.

7. The method of claim 5, further comprising:
   defining a number of EPFD intervals for the selected location based, at least in part, on the defined step functions; and
   determining the power back-off value for the selected location based, at least in part, on the number of defined EPFD intervals.

8. The method of claim 7, wherein determining the power back-off value comprises:
   simulating an operation of the NGSO satellite for a finite number of time ticks;
   detecting violations of the EPFD percentile limits associated with each of the number of defined EPFD intervals; and
   calculating the power back-off value based, at least in part, on the detected violations.

9. An apparatus for operating a non-geosynchronous orbit (NGSO) satellite to comply with equivalent power flux density (EPFD) limits, the apparatus comprising:
   for each of a number of selected locations on Earth:
   means for determining a first cumulative distribution function (CDF) of EPFD levels associated with reception of a beam, to be transmitted from the NGSO satellite, at the selected location;
   means for identifying a number of EPFD percentile limits that are violated by the first CDF of EPFD levels;

means for determining a second CDF of EPFD levels at the selected location based, at least in part, on the number of identified EPFD percentile limits; and means for determining a power back-off value for the selected location based, at least in part, on the second CDF of EPFD levels;

means for compiling the determined power back-off values for the number of selected locations into a power back-off schedule; and means for dynamically adjusting a power level of the beam to be transmitted from the NGSO satellite based on the power back-off schedule.

10. The apparatus of claim 9, wherein the power back-off schedule represents the power back-off values as a function of latitude on Earth.

11. The apparatus of claim 9, wherein the power back-off schedule comprises a vector including a number of components, each component indicating the power back-off value for a corresponding latitude on Earth.

12. The apparatus of claim 9, wherein the second CDF of EPFD levels does not violate any of the number of identified EPFD percentile limits.

13. The apparatus of claim 9, wherein the means for determining the second CDF of EPFD levels is to:
define, for each of the number of identified EPFD percentile limits, a corresponding step function; and
modify the first CDF of EPFD levels to include the defined step functions.

14. The apparatus of claim 13, wherein each of the defined step functions is to avoid violating a corresponding one of the number of identified EPFD percentile limits, each of the identified EPFD percentile limits associated with a corresponding reference antenna dish size of a geosynchronous (GSO) earth station.

15. The apparatus of claim 13, further comprising:
means for defining a number of EPFD intervals for the selected location based, at least in part, on the defined step functions; and
means for determining the power back-off value for the selected location based, at least in part, on the number of defined EPFD intervals.

16. The apparatus of claim 15, wherein the means for determining the power back-off value is to:
simulate an operation of the NGSO satellite for a finite number of time ticks;
detect violations of the EPFD percentile limits associated with each of the number of defined EPFD intervals; and
calculate the power back-off value based, at least in part, on the detected violations.

17. An apparatus for operating a non-geosynchronous orbit (NGSO) satellite to comply with equivalent power flux density (EPFD) limits, the apparatus comprising:
one or more processors; and
a memory configured to store instructions that, when executed by the one or more processors, cause the apparatus to:
for each of a number of selected locations on Earth:
determine a first cumulative distribution function (CDF) of EPFD levels associated with reception of a beam, to be transmitted from the NGSO satellite, at the selected location;
identify a number of EPFD percentile limits that are violated by the first CDF of EPFD levels;
determine a second CDF of EPFD levels at the selected location based, at least in part, on the number of identified EPFD percentile limits; and
determine a power back-off value for the selected location based, at least in part, on the second CDF of EPFD levels;
compile the determined power back-off values for the number of selected locations into a power back-off schedule; and
dynamically adjust a power level of the beam to be transmitted from the NGSO satellite based on the power back-off schedule.

18. The apparatus of claim 17, wherein the power back-off schedule represents the power back-off values as a function of latitude on Earth.

19. The apparatus of claim 17, wherein the power back-off schedule comprises a vector including a number of components, each component indicating the power back-off value for a corresponding latitude on Earth.

20. The apparatus of claim 17, wherein execution of the instructions for determining the second CDF of EPFD levels causes the apparatus to:
define, for each of the number of identified EPFD percentile limits, a corresponding step function; and
modify the first CDF of EPFD levels to include the defined step functions.

21. The apparatus of claim 20, wherein each of the defined step functions is to avoid violating a corresponding one of the number of identified EPFD percentile limits, each of the identified EPFD percentile limits associated with a corresponding reference antenna dish size of a geosynchronous (GSO) earth station.

22. The apparatus of claim 20, wherein execution of the instructions causes the apparatus to further:
define a number of EPFD intervals for the selected location based, at least in part, on the defined step functions; and
determine the power back-off value for the selected location based, at least in part, on the number of defined EPFD intervals.

23. The apparatus of claim 22, wherein execution of the instructions for determining the power back-off value causes the apparatus to:
simulate an operation of the NGSO satellite for a finite number of time ticks;
detect violations of the EPFD percentile limits associated with each of the number of defined EPFD intervals; and
calculate the power back-off value based, at least in part, on the detected violations.

24. A non-transitory computer-readable medium storing instructions that, when executed by one or more processors of an apparatus, cause the apparatus to perform operations comprising:
for each of a number of selected locations on Earth:
determining a first cumulative distribution function (CDF) of EPFD levels associated with reception of a beam, to be transmitted from a non-geosynchronous orbit (NGSO) satellite, at the selected location;
identifying a number of EPFD percentile limits that are violated by the first CDF of EPFD levels;
determining a second CDF of EPFD levels at the selected location based, at least in part, on the number of identified EPFD percentile limits; and
determining a power back-off value for the selected location based, at least in part, on the second CDF of EPFD levels;
compiling the determined power back-off values for the number of selected locations into a power back-off schedule; and dynamically adjusting a power level of the beam to be transmitted from the NGSO satellite based on the power back-off schedule.

25. The non-transitory computer-readable medium of claim 24, wherein the power back-off schedule represents the power back-off values as a function of latitude on Earth.

26. The non-transitory computer-readable medium of claim 24, wherein the power back-off schedule comprises a vector including a number of components, each component indicating the power back-off value for a corresponding latitude on Earth.

27. The non-transitory computer-readable medium of claim 24, wherein execution of the instructions for determining the second CDF of EPFD levels causes the apparatus to perform operations further comprising:
  defining, for each of the number of identified EPFD percentile limits, a corresponding step function; and
  modifying the first CDF of EPFD levels to include the defined step functions.

28. The non-transitory computer-readable medium of claim 27, wherein each of the defined step functions is to avoid violating a corresponding one of the number of identified EPFD percentile limits, each of the identified EPFD percentile limits associated with a corresponding reference antenna dish size of a geosynchronous (GSO) earth station.

29. The non-transitory computer-readable medium of claim 27, wherein execution of the instructions causes the apparatus to perform operations further comprising:
  defining a number of EPFD intervals for the selected location based, at least in part, on the defined step functions; and
  determining the power back-off value for the selected location based, at least in part, on the number of defined EPFD intervals.

30. The non-transitory computer-readable medium of claim 29, wherein execution of the instructions for determining the power back-off value causes the apparatus to perform operations further comprising:
  simulating an operation of the NGSO satellite for a finite number of time ticks;
  detecting violations of the EPFD percentile limits associated with each of the number of defined EPFD intervals; and
  calculating the power back-off value based, at least in part, on the detected violations.

* * * * *